United States Patent
Mullins et al.

(10) Patent No.: US 11,295,359 B1
(45) Date of Patent: Apr. 5, 2022

(54) NESTED CONDITIONS FOR BLOCKCHAIN-ENFORCED CONTRACTS

(71) Applicant: Block, Inc., San Francisco, CA (US)

(72) Inventors: Brian John Mullins, San Francisco, CA (US); Kay Sueru Feker, San Francisco, CA (US); Steffano Santiago Chavez, Clayton, MO (US); Michael Andrew Tomkins, San Francisco, CA (US); Nicole Antonio Maulino, San Ramon, CA (US); Ryan Yi-Lin Tai, Mountain View, CA (US)

(73) Assignee: Block, Inc., San Francisco, CA (US)

( * ) Notice: Subject to any disclaimer, the term of this patent is extended or adjusted under 35 U.S.C. 154(b) by 75 days.

(21) Appl. No.: 15/992,121

(22) Filed: May 29, 2018

(51) Int. Cl.
| | | |
|---|---|---|
| *G06Q 30/04* | (2012.01) | |
| *G06Q 20/10* | (2012.01) | |
| *G06Q 20/06* | (2012.01) | |
| *G06Q 30/06* | (2012.01) | |
| *G06Q 10/08* | (2012.01) | |
| *H04L 9/06* | (2006.01) | |
| *G06Q 20/22* | (2012.01) | |

(52) U.S. Cl.
CPC ......... *G06Q 30/04* (2013.01); *G06Q 10/0837* (2013.01); *G06Q 20/065* (2013.01); *G06Q 20/102* (2013.01); *G06Q 20/223* (2013.01); *G06Q 30/0641* (2013.01); *H04L 9/0637* (2013.01); *H04L 2209/38* (2013.01)

(58) Field of Classification Search
CPC .......................... G06Q 30/04; G06Q 10/0837
See application file for complete search history.

(56) References Cited

U.S. PATENT DOCUMENTS

| | | | | |
|---|---|---|---|---|
| 8,311,895 B1* | 11/2012 | Murugan | ............... | G06Q 50/28 |
| | | | | 705/26.1 |
| 2008/0257957 A1* | 10/2008 | Steinecker | ........... | G06Q 20/367 |
| | | | | 235/380 |
| 2009/0119190 A1* | 5/2009 | Realini | .................. | G06Q 20/10 |
| | | | | 705/30 |

(Continued)

OTHER PUBLICATIONS

Final Office Action dated Apr. 4, 2019, for U.S. Appl. No. 15/992,117, of Mullins, B.J., et al., filed May 29, 2018.

(Continued)

*Primary Examiner* — Peter Ludwig
*Assistant Examiner* — Avia Salman
(74) *Attorney, Agent, or Firm* — Baker Botts L.L.P.

(57) ABSTRACT

In one embodiment, a method includes receiving one or more selected options for one or more of multiple contract conditions generated based on transaction information associated with a request to create a blockchain-related invoice and generating instructions for a blockchain-enforced contract based on the transaction information and the one or more selected options. The instructions for the blockchain-enforced contract correspond to a first nested contract including a first contract condition required for a transfer of a value and a second nested contract including a second contract condition required for at least a partial reversal of the transfer of the value. The method also includes, in response to receiving an input regarding the second contract condition, cause the instructions for the blockchain-enforced contract to be executed on a blockchain network.

20 Claims, 20 Drawing Sheets

(56) References Cited

U.S. PATENT DOCUMENTS

| | | | | |
|---|---|---|---|---|
| 2015/0330806 A1* | 11/2015 | Nallu | ................ | G06F 16/24575 |
| | | | | 701/411 |
| 2017/0255974 A1 | 9/2017 | Kulkarni | | |
| 2018/0005186 A1 | 1/2018 | Isaacson et al. | | |
| 2018/0025442 A1* | 1/2018 | Isaacson | ............. | H04L 63/0861 |
| | | | | 705/26.62 |
| 2019/0197503 A1 | 6/2019 | Yu et al. | | |

OTHER PUBLICATIONS

Non-Final Office Action dated Aug. 23, 2018, for U.S. Appl. No. 15/992,117, of Mullins et al., filed Sep. 14, 2018.
Non-Final Office Action dated Mar. 19, 2020, for U.S. Appl. No. 15/992,117, of Mullins, B.J., et al., filed Sep. 14, 2018.
Final Office Action dated Aug. 3, 2020, for U.S. Appl. No. 15/992,117, of Mullins, B.J., et al., filed May 29, 2018.
Non-Final Office Action dated Jun. 24, 2021, for U.S. Appl. No. 15/992,117, of Mullins, B.J., et al., filed Sep. 14, 2018.
Non-Final Office Action dated Jan. 4, 2022, for U.S. Appl. No. 15/992,117, of Mullins, B.J., et al., filed Sep. 14, 2018.

* cited by examiner

New Invoice

Customer Information

| Name | Full Name |
| Email | Email Address |

Add Additional Recipient

Invoice Details

| Invoice Title | Optional |
| Invoice ID | 0001 |
| Message | Thanks for your business! |
| Invoice Method | Send Invoice by Email ⌄ |
| Send | Immediately ⌄ | Due | Upon Receipt ⌄ |

Preview — 401
Save as Draft — 402
Send — 403

New Invoice

Customer Information

| Name | Michael Tomkins |
| Email | hello@mtomkins.com |
| Add Additional Recipient | |

Invoice Details

| Invoice Title | Sunflower Clock |
| Invoice ID | 2452 |
| Message | 1950's original production with intact label |
| Invoice Method | Send Invoice by Email ⌄ |
| Send | Immediately ⌄ | Due | Upon Receipt ⌄ |

Preview — 401
Save as Draft — 402
Send — 403

New Invoice

*400b*

[Preview] 401  [Save as Draft] 402  [Send] 403

Line Items

430

| Item Name | | Quantity | Price | Total |
|---|---|---|---|---|
| > Sunflower Clock | Customize | 1 | $2,498.00 | $2,498.00 |

Taxes Sales Tax (8.5%)

Add Item or Service

Add Discount     USD⌄

Subtotal     $2,498.00
Sales Tax (8.5%)     $212.33
Total     $2,710.33  ← 432

Pay no processing fees when you transact with Bitcoin or Ethereum.

More Options

440

| Shipping Address | ▷ Request shipping address |
| Tipping | ▷ Allow Customer to add a tip |
| Card on File | ▷ Allow Customer to save their card |

*FIG. 4C*

New Invoice 400b

Preview — 401
Save as Draft — 402
Send — 403

Line Items

| Item Name | Quantity | Price | Total |
|---|---|---|---|
| > Sunflower Clock    Customize | 1 | $2,498.00 | $2,498.00 |

Taxes Sales Tax (8.5%)

Add Item or Service

430

Add Discount

Subtotal
Sales Tax (8.5%) ⓘ

Total    $2,710.33

USD ✓
BTC
ETH

434

Pay no processing fees when you transact with Bitcoin or Ethereum.

More Options

| Shipping Address | ▷ Request shipping address |
| Tipping | ▷ Allow Customer to add a tip |
| Card on File ⓘ | ▷ Allow Customer to save their card |

New Invoice

Preview — 401
Save as Draft — 402
Send — 403

400b

Line Items

| Item Name | Quantity | Price | Total |
|---|---|---|---|
| > Sunflower Clock Customize | 1 | $2,498.00 | $2,498.00 |

430

Taxes Sales Tax (8.5%)

Add Item or Service

Add Discount

Subtotal — 0.1849 BTC ($2,498.00)

Sales Tax (8.5%) — 0.0157 BTC ($212.33)

Total — 0.2006 BTC ($2,710.33)

BTC ∨  432

☐ Pay customer's processing/network fees. What's this?

New Invoice

Preview — 401
Save as Draft — 402
Send — 403

Smart Contracts

Transacting in cryptocurrency affords you the unique ability to structure the terms and conditions upon which payments are released and disputes are resolved.

| Pay When | Return Policy | Dispute Resolution |

Buyer Confirms Delivery ⌄

⦿ Buyer Confirms Delivery  Free
◯ Carrier Confirms Delivery  0.5% Fee
◯ Payment Service  Confirms Delivery  1% Fee

454

Select the conditions to satisfy each smart contract. Default options are free, while other options may cost an additional fee.

More Options

| Shipping Address | Tipping | Attachments |

☑ Request shipping address
☑ Allow Customer to add a tip
☐ Add Attachment

New Invoice — 400b

Preview — 401
Save as Draft — 402
Send — 403

Smart Contracts

Transacting in cryptocurrency affords you the unique ability to structure the terms and conditions upon which payments are released and disputes are resolved.

Pay When: Buyer Confirms Delivery ⌄

Return Policy: Within 30 Days of Purchase ⌄

Dispute Resolution — 455
- ● Within 30 Days of Purchase Free
- ○ Restocking Fee 0.5% Fee
- ○ Reason Code for Return 0.5% Fee Select the conditions to satisfy an additional fee.

More Options — 460

Shipping Address: ☑ Request shipping address

Tipping: ☑ Allow Customer to add a tip

Attachments: Add Attachment

*FIG. 4H*

New Invoice — 400b

Preview — 401
Save as Draft — 402
Send — 403

Smart Contracts

Transacting in cryptocurrency affords you the unique ability to structure the terms and conditions upon which payments are released and disputes are resolved.

- Pay When: Buyer Confirms Delivery ˅
- Return Policy: Within 30 Days of Purchase ˅
- Dispute Resolution: Resolved by Community ˅
  - ◉ Resolved by Community   Free
  - ○ Resolved by Payment Service   0.5% Fee
  - ○ Resolved by Third-party Arbiter   1% Fee   — 456

Select the conditions to satisfy an additional fee. — 460

More Options

- Shipping Address: ☑ Request shipping address
- Tipping: ☑ Allow Customer to add a tip
- Attachments: Add Attachment

*FIG. 4I*

Invoices

$1,024.00
PAID (LAST 30 DAYS) ›

$1,024.00
OUTSTANDING ›

$1,024.00
DRAFTS ›

Invoices    Recurring

[Search Invoices]

[All Invoices ˅]   [All Time ˅]   [Market Street ˅]

[Create Invoice]

| Date | ID | Customer | Title | Status | Amount |
|---|---|---|---|---|---|
| 1/17/2018 | 0009 | Michael Tomkins | Sunflower Clock | Pending # | 0.2006 BTC |
| 1/17/2018 | 0008 | Toby Ziegler | Furniture Order | Paid | $1,400.00 |
| 1/17/2018 | 0007 | Josh Lyman | Chair Order | Canceled | $400.00 |
| 1/17/2018 | 0006 | CJ Cregg | Furniture Order | Draft | $1,600.00 |
| 1/17/2018 | 0005 | Charlie Young | Desk Order | Refunded | $600.00 |
| 1/17/2018 | 0004 | Donna Moss | Dresser Order | Scheduled | $1,000.00 |
| 1/17/2018 | 0003 | Leo McGary | Coffee Table Order | Unpaid | $300.00 |
|  |  |  | Shelf Order | Undelivered | $700.00 |
|  |  |  | Furniture Order | Failed | $900.00 |

⓿ Invoice successfully sent to hello@mtomkins.com

Invoices

$1,024.00
PAID (LAST 30 DAYS) ›

$1,0...
OUTSTA...

Search Invoices    All Invoices ›

| Date | ID | Customer |
|------|-----|----------|
| 1/17/2018 | 0009 | Michael Tom... |
| 1/17/2018 | 0008 | Toby Ziegler |
| 1/17/2018 | 0007 | Josh Lyman |
| 1/17/2018 | 0006 | CJ Cregg |
| 1/17/2018 | 0005 | Charlie Youn... |
| 1/17/2018 | 0004 | Donna Moss |
| 1/17/2018 | 0003 | Leo McGary |
| 01/17/2018 | 0001 | Deloris Landi... |

Share Link   Edit   More ›

- ⦿ Buyer confirmed delivery on January 18, 2018. 0.2006 BTC has been deposited to your address.
- Invoice paid. Funds will be released upon buyer delivery confirmation. Yesterday
- Invoice created and sent to Michael Tomkins. 2 days ago Invoice #2452
Created on January 17, 2018

Customer
Michael Tomkins (hello@mtomkins.com)

1950's original production with intact label

Sunflower Clock                    0.1849 BTC
                                   ($2,498.00)

Done

*FIG. 4L*

NESTED CONDITIONS FOR BLOCKCHAIN-ENFORCED CONTRACTS

BACKGROUND

A blockchain may provide an immutable and transparent record of transactions that is redundantly held among a distributed network of users. Blockchain technology has enabled the creation of various cryptocurrencies, which may be used for payments in transactions involving exchange of goods or services. Cryptocurrency transactions on a blockchain may offer certain benefits over traditional fiat currency transactions, such as efficiency, low cost, and certainty. A blockchain may also be used to store smart contracts that may be executed to automatically transfer value upon receiving required inputs. Smart contracts may be used to facilitate various commercial transactions or other applications.

An ordinary merchant or customer may face substantial hurdle in using smart contract for everyday transactions. The creation and validation of smart contracts may require significant relevant expertise. Furthermore, the correspondence between logic in a smart contract and a real-world contractual relationship may not be readily decipherable to an ordinary person. In addition, special-purpose software may be required for creating a smart contract and deploying a smart contract to a blockchain network. Such software may generally not be available on devices used by a merchant or a customer (e.g., a point of sale device, a smart phone) and not be integrated with software used for processing and recording payment transactions. Manually creating a smart contract and deploying it to a blockchain network in real time may cause a substantial delay and may be prone to human errors in programming, which may prevent the use of smart contracts in everyday transactions.

Although the immutable nature of a blockchain may create a sense of credibility in particular use cases, it may also hinder the wide use of cryptocurrencies in commercial transactions. Fiat currency transactions are often carried out through a trusted third party (e.g., a card network). The trusted third party may often provide dispute resolution services, which may allow refund in case of return or cancellation of orders or dissatisfaction with goods or services. Because cryptocurrency transactions may often be carried out without the involvement of a trusted third party, no dispute resolution procedures may exist for such transactions. Once a smart contract is deployed to a blockchain network, code associated with the smart contract may be permanently fixed and there may be no individual or entity capable of stopping or reversing the execution of the smart contract. A customer dissatisfied with an order may be left out of recourse as the customer's funds may have been irreversibly transferred to a merchant.

BRIEF DESCRIPTION OF THE DRAWINGS

FIGS. 4A-4I illustrate example user interfaces for creating an invoice and collecting information for a blockchain-enforced contract corresponding to the invoice.

FIGS. 4J-4L illustrate example user interfaces for tracking the status of an invoice and a corresponding blockchain-enforced contract.

DESCRIPTION OF EXAMPLE EMBODIMENTS

Figure 1A:
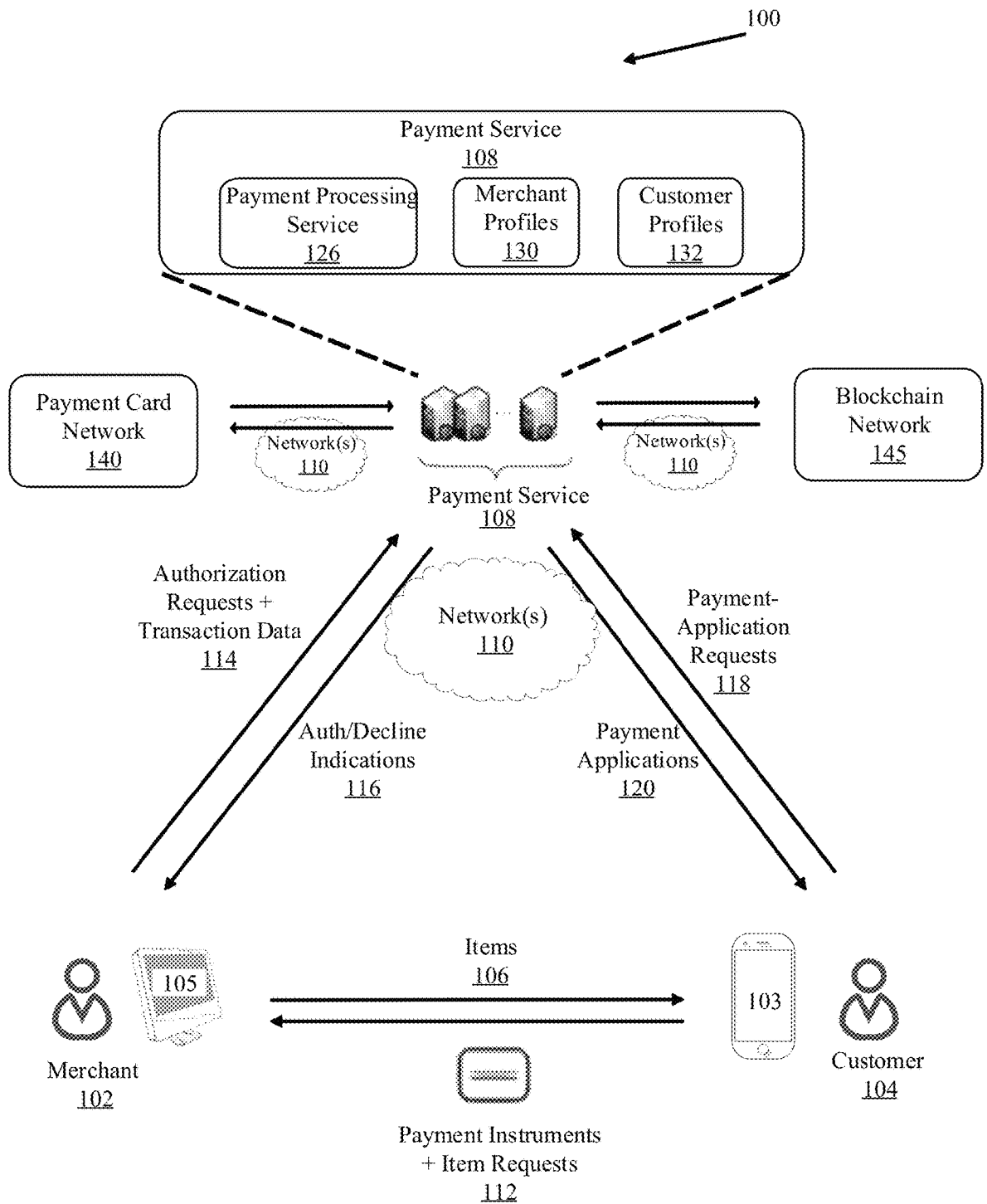
FIGS. 1A and 1B illustrate an example payment service network.

Embodiments described herein enable the creation of an intelligent smart contract on the blockchain at a point of sale (POS) system, without requiring the POS system to be equipped with software or hardware for distributed-application programming or blockchain data storage. Since a smart contract requires code that signals if and when the smart contract executes, particular embodiments generate the necessary code automatically (requiring no human coding) based on the agreed upon terms of an invoice or other agreement and deploys the contract to virtual machines running on nodes associated with the blockchain. Particular embodiments automatically generate code executable to reverse a smart-contract transaction and structure such code in a smart contract based on the agreed upon terms of an invoice or other agreement. Particular embodiments automatically analyze data associated with parties to an upcoming invoice and intelligently suggest terms of the invoice or a corresponding smart contract to the parties.

In particular embodiments, a payment service system may provide a platform for the creation and execution of blockchain transactions through blockchain-enforced contracts (e.g., smart contracts). The payment service system may provide for display to a merchant a user interface that allows the merchant to create a customizable invoice for products sold or services rendered. Within the user interface, a merchant may request an invoice to be created, input information about an existing or potential transaction, specifying one or more terms and conditions for the invoice, preview and confirm a draft invoice generated by the payment service system. Based on the information received from the merchant, the payment service system may create a blockchain-enforced contract on the backend that mirrors the terms and conditions associated with the invoice. The blockchain-enforced contract and associated programming logic or coded instructions may be uploaded to a corresponding blockchain for storage and execution. If the merchant and a customer agree to conduct a transaction in a cryptocurrency, the transaction may be executed using the blockchain-enforced contract. The customer may activate the blockchain-enforced contract generated by the payment service system by accepting the merchant's invoice. The blockchain-enforced contract may then transfer an agreed-upon value in the cryptocurrency among the customer, the merchant, and one or more third parties according to the terms and conditions associated with the invoice. Particular embodiments may thereby enable simple and efficient creation of blockchain-enforced contracts and transactions using such contract. Users may be ensured that the blockchain-enforced contracts generated this way will execute in consistency with the corresponding invoice. This may provide involved parties benefits of blockchain transactions such as reliability, auditability, quickness, and low cost, while retaining the accessibility and clarity of a conventional invoice.

In particular embodiments, the payment service system may provide dispute resolution for blockchain transactions. Nested smart contracts that allow recourse for cryptocurrency payments may be introduced into a blockchain-enforced contract. Such a nested smart contract may be triggered upon events such as a return request by a customer or dispute as to quality of goods or services. The nested smart contracts associated with dispute resolution may be created based on the transaction information provided and terms and conditions specified by the merchant. Moreover, examples of the present invention enable intelligent creation of terms of the smart contracts based on previous transactions of the customer and/or merchant on the payment service system. They may also be based on baseline customer protections provided by the payment service system. Execution of such nested smart contracts may allow the payment service system or a customer to recapture value transferred in a blockchain transaction. Particular embodiments may thereby add a "trust layer" on top of blockchain transactions. This may solve the problem created by the immutable nature of blockchain transactions and create accountability and customer protection.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A illustrates an example environment 100 that includes merchant 102 that conducts transactions with customer 104 (or "user 104") for items 106 offered by the merchant 102. FIG. 1A also illustrates a payment service system 108 (also referred to as "payment service"), coupled to merchant point of sale (POS) device 105 and customer device 103 via a network 110, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g. item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is "dipped" into the reader, such as chips that comply with the Europay, MasterCard, Visa (EMV) standard, i.e. EMV cards. In other examples, other types of payment instruments include cards or computing devices that communicate via radiofrequencies such as a radiofrequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service 108 over network 110, either substantially contemporaneously with the conducting of the transaction (in the case of online transactions) or later when POS device 105 is in the online mode (in the case offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132.

The payment processing service 126 may function to receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

Generally, when a customer and a merchant enter into an electronic payment transaction, the transaction is processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service 108 may communicate over network(s) 110 with blockchain network 145. Such networks may include for example, the Bitcoin network, the Ethereum network, etc. Blockchain networks may commonly be associated with a network of parties that cryptographically verify and validate transactions and record transactions on copies of a distributed ledger commonly called a blockchain. Once a transaction has been validated, the blockchain network 145 may approve the transaction by writing the transaction to the blockchain.

In particular embodiments, the blockchain network 145 may support one or more protocols for blockchain-enforced contracts or smart contracts. One or more blockchain-enforced contracts may be stored on a distributed ledger shared by one or more nodes associated with the blockchain network 145. One or more inputs addressed to a blockchain-enforced contract may cause execution of the smart contract via the generated code instructions so as to transfer cryptocurrency or other assets among parties or to perform one or more other suitable functionalities. Over network(s) 110, the payment service 108 may send one or more smart contracts, one or more inputs, or one or more blockchain transactions to the blockchain network 145. The POS device 105 and customer device 103 may also send one or more smart contracts, one or more inputs, or one or more blockchain transactions to the blockchain network 145 over the network(s) 110. Furthermore, the payment service system 108, the POS device 105, or the customer device 103 may comprise one or more nodes associated with the blockchain network 145. The node may store a copy of the blockchain or obtain information about one or more blockchain-enforced contracts and one or more blockchain transactions from the blockchain network 145. The blockchain network 145 may comprise a virtual machine hosted collectively by a plurality of its nodes. A smart contract may be deployed on and executed by the virtual machine.

While FIG. 1A illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payments application, such as a mobile wallet application, from the payment service 108. FIG. 1A illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

According to an implementation of the present subject matter, the customers and merchants may send and receive payments in virtual currencies via the payment service for purchase of items or a selected set of items. In another implementation, the customers send payments in virtual currencies via the payment service, while the payment service converts a first virtual currency into another virtual currency or a fiat currency of merchant's choice.

Figure 1B:
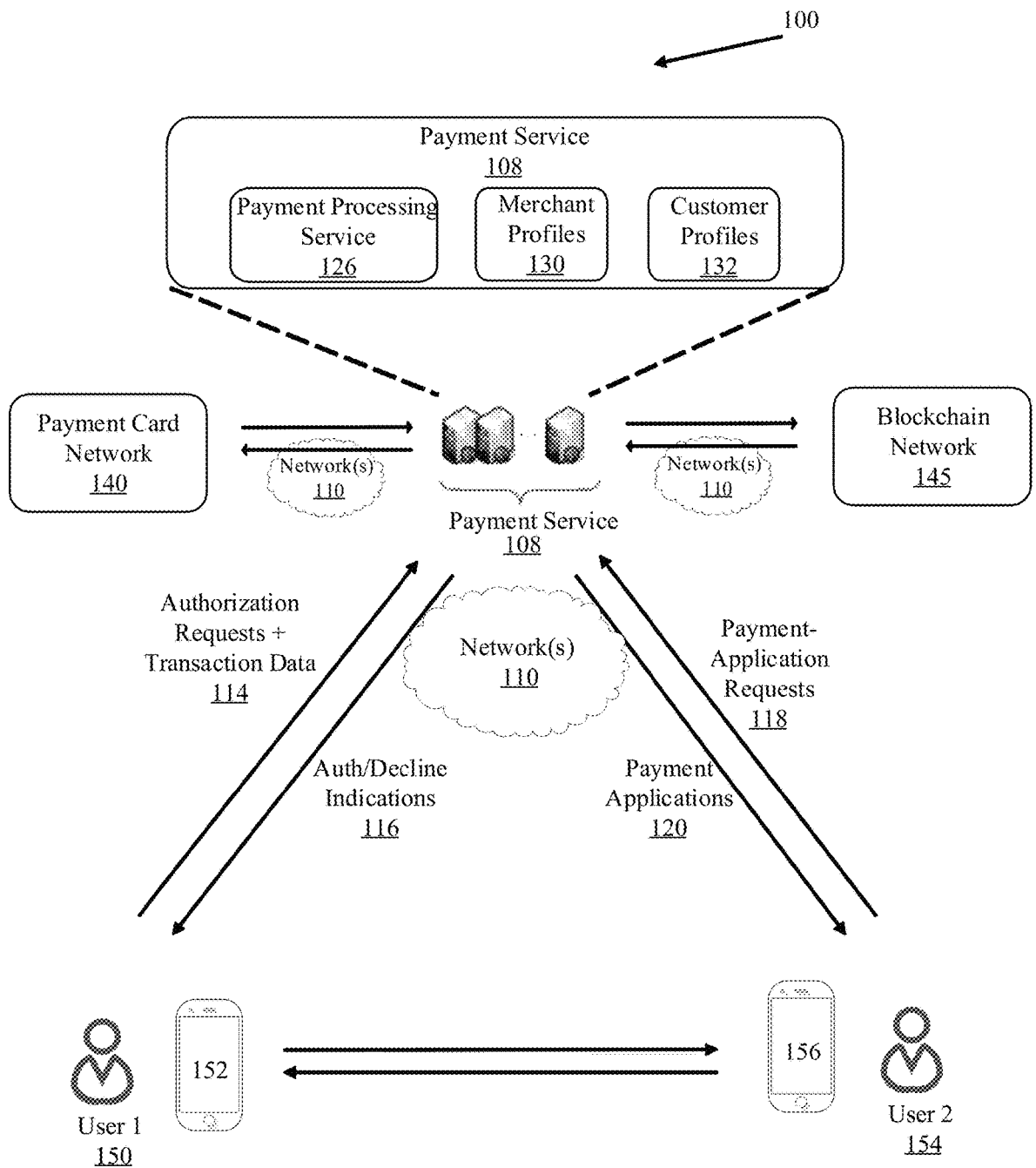

FIG. 1B illustrates another embodiment of example environment 100 except that in FIG. 1B a transaction is between a first user 150 operating device 152, and a second user 154 operating device 156. Devices 152 and 156 may be a computing device with an application provided by payment service 108 executing thereon. In some embodiments, the application may be point of sale application. In some embodiments, the application may be a mobile wallet application. In some embodiments the application may be an application provided by a third party capable of accessing at least one payment account.

FIG. 1B illustrates the broader concept that the present technology contemplates that currency may be sent from any party of any character (merchant, user, bank, etc.) to any other party of any character using the innovations described herein.

Figure 2:
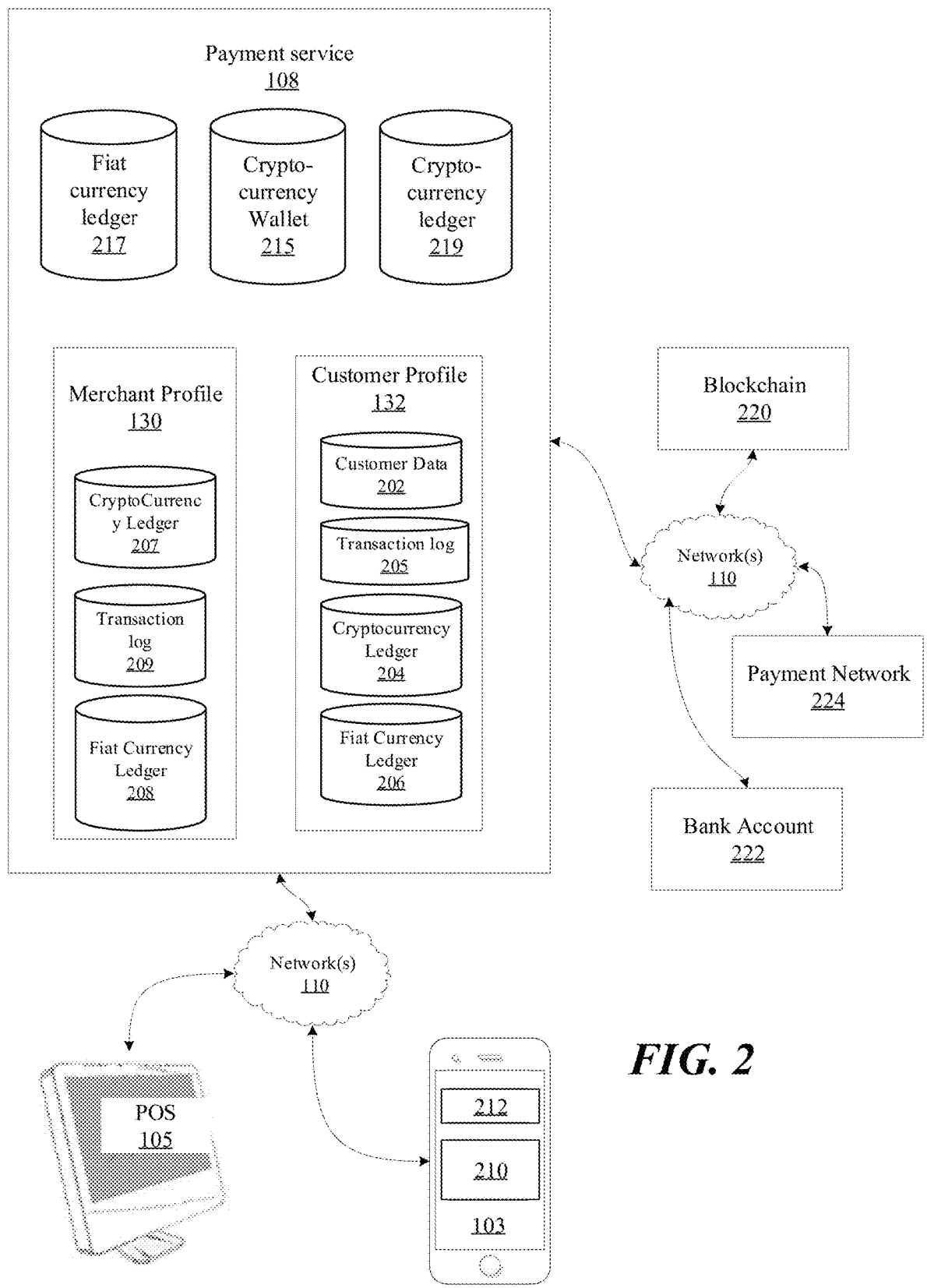
FIG. 2 illustrates an example system architecture for a payment service system.

FIG. 2 illustrates an example system architecture that allows customer 104 to pay with a virtual currency, especially a cryptocurrency that utilizes a blockchain to record transactions.

As introduced with respect to FIGS. 1A and 1B, payment service 108 may store customer profile 132. Customer profile 132 may include customer data 202 which may include customer identifying information (name, contact information, etc.), records of past transactions 205 involving payment service 108 by customer 104, information regarding linked accounts (credit card information, bank account information, etc.), information regarding services utilized by customer profile 132 (e.g., the account utilizes a mobile wallet application 210 provided by payment service 108, etc.).

In addition to customer data 202, customer profile 132 may also include a ledger for any accounts managed by payment service 108 on behalf of customer 104. For example, as illustrated in FIG. 2, customer profile 132 includes customer cryptocurrency ledger 204, and a customer fiat currency ledger 206 indicating that customer 104 utilizes payment service 108 to manage accounts of a cryptocurrency (such as bitcoin), and a fiat currency (such as US dollars), respectively. In some embodiments customer profile 132 for customer 104 may include ledgers for more or less accounts. It will be appreciated that in some embodiments the ledgers are logical ledgers, and the actual data may be represented in a single database.

Each account ledger (204, 206) may reflect a positive balance when customer 104 funds the accounts. An account may be funded by transferring currency in the form associated with the account from an external account (e.g., transferring a value of cryptocurrency to payment service and the value is credited as a balance in cryptocurrency ledger 204), or by purchasing currency in the form associated with the account from the payment service using currency in a different form (e.g., buying a value of cryptocurrency from payment service 108 using a value of fiat currency reflected in fiat currency ledger 206, and crediting the value of cryptocurrency in cryptocurrency ledger 204), or by conducting a transaction with another user (customer or merchant) of the payment service wherein the account receives incoming currency. In some embodiments customer profile 132 may include preferences for maintaining balances in cryptocurrency. In such embodiments, payment service 108 may automatically debit fiat currency ledger 206 to increase cryptocurrency ledger 204, or a payment card associated with customer profile whenever cryptocurrency balances fall below a stated level. Conversely, in some embodiments, payment service 108 may automatically credit fiat currency ledger 206 to decrease cryptocurrency ledger 204 whenever cryptocurrency balances rise above a stated level. In some embodiments, automatic transactions may be further defined by an exchange rate between the cryptocurrency and the fiat currency such that transactions to buy or sell cryptocurrency may occur when exchange rates are favorable.

With specific reference to funding a cryptocurrency account, customer 104 may have a balance of cryptocurrency stored in third party digital wallet 212 on customer 104's computing device 103 unrelated to payment service 108 and customer 104 may transfer all or a portion of the balance of the cryptocurrency stored in third party digital wallet 212 to payment service 108 as is well known to those of skill in the art. Such a transaction may require customer 104 to transfer an amount of the virtual currency in a message signed by customer 104's private key to an address provided by payment service 108. A user may enter a third party digital wallet 212 address associated with the balance of cryptocurrency they would like to transfer into payment service 108. The transaction may be sent to miners to bundle the transaction into a block of transactions and to verify the authenticity of the transactions in the block. Once a miner has verified the block, the block may be written to a public, distributed blockchain 220 where payment service 108 may then verify that the transaction has been confirmed and may credit customer's cryptocurrency ledger 204 with the transferred amount.

Similarly, as introduced with respect to FIGS. 1A and 1B, payment service 108 may store merchant profile 130. The merchant profile 130 may comprise a cryptocurrency ledger 207, a transaction log 209, and a fiat currency ledger 208.

In some embodiments, payment service 108 may individually acquire cryptocurrency from a third-party source. Payment service 108 cryptocurrency wallet 215 may be associated with many different addresses, and may vary addresses used to acquire cryptocurrency so that its holdings are represented under a variety of addresses on blockchain 220. When payment service 108 has its own holdings of cryptocurrency, customers, such as customer 104, may acquire cryptocurrency directly from payment service 108. In some embodiments, payment service may include logic for buying and selling cryptocurrency in order to maintain a desired level of cryptocurrency. The desired level may be based on a volume of transactions over a period, balances of collective customer profiles cryptocurrency ledgers, exchange rates, or trends in changing of exchange rates such that the cryptocurrency is trending towards gaining or loosing value with respect to the fiat currency. Payment service 108 may store a cryptocurrency ledger 219 and a cash ledger 217 for recording respective transactions.

While payment service 108 has credited customer 104's cryptocurrency ledger 204, the transferred cryptocurrency (data with address provided for receipt of transaction and a balance of cryptocurrency transferred in transaction) is stored in payment service 108's cryptocurrency wallet 215. Additionally, while payment service 108 recognizes that customer 104 retains the value of the transferred cryptocurrency through crediting customer 104's cryptocurrency ledger 204, any person that inspects blockchain 220 will see the cryptocurrency as having been transferred to payment service 108. In some embodiments, payment service 108's cryptocurrency wallet 215 may be associated with many different addresses. In such embodiments any person that inspects blockchain 220 may not easily associate all cryptocurrency stored in cryptocurrency wallet 215 as belonging to the same entity.

In particular embodiments, transfer of cryptocurrency between a user and the payment service 108 or among different users may be automatically carried by the blockchain network 145 based on one or more blockchain-enforced contracts stored on the blockchain 220. The transfer of cryptocurrency may be between third-party cryptocurrency wallets associated with the users and the cryptocurrency wallet 115 associated with the payment service 108.

As addressed above, in some embodiments customer 104 may also have other accounts maintained by payment service 108. For example, customer 104 may also have an account in US dollars. Such account may be funded by transferring money from bank account 222 at a third-party bank to an account maintained at payment service 108 as is conventionally known. The transferred money will be reflected in fiat currency ledger 206.

Customer 104's fiat currency ledger 206 or cryptocurrency ledger 204 may be credited when conducting a transaction with another user (customer or merchant) of the payment service wherein the account receives incoming currency.

Additionally, customer 104 may also have one or more external payment cards registered with payment service 108 and recorded in customer data 202. Unlike cryptocurrency accounts and fiat currency accounts recorded in cryptocurrency ledger 204 and fiat currency ledger 206 respectively, external payment card accounts are not accounts managed by payment service 108. Instead, an appropriate external payment network 224 may process transactions conducted with payment cards.

Additionally, customer 104 may also have one or more internal payment cards registered with payment service 108. Internal payment cards may be linked to all accounts associated with customer profile 132. In some embodiments, options with respect to internal payment cards may be adjusted and managed using application 210. For example, when customer profile 132 includes multiple payment accounts (e.g., cryptocurrency and fiat currency), application 210 may set one of those accounts to be the default account for debits or credits when using an internal payment card.

Customer 104 may access and monitor customer profile 132 including payment cards registered with payment service 108, cryptocurrency ledger 204, and fiat currency ledger 206 through application 210. Application 210 may be a customer facing application provided by payment service 108, or that is configured to access customer profile 132 through use of one or more APIs provided by payment service.

In some embodiments, application 210 may provide digital wallet functionality including storing payment methods and permitting electronic payments by customer device 103 at the instruction of application 210.

In particular embodiments, a payment service system 108 may provide a platform for the creation and execution of blockchain transactions through blockchain-enforced contracts. The payment service system 108 may provide for display to a merchant a user interface that allows the merchant to create a customizable invoice for products sold or services rendered. Within the user interface, a merchant may request an invoice to be created, input information about an existing or potential transaction, specifying one or more terms and conditions for the invoice, preview and confirm a draft invoice generated by the payment service system 108. Based on the information received from the merchant, the payment service system 108 may create a blockchain-enforced contract on the backend that mirrors the terms and conditions associated with the invoice. The blockchain-enforced contract may be uploaded to a corresponding blockchain for storage and execution. If the merchant and a customer agree to conduct a transaction in a cryptocurrency, the transaction may be executed using the blockchain-enforced contract. The customer may activate the blockchain-enforced contract generated by the payment service system 108 by accepting the merchant's invoice. The blockchain-enforced contract may then transfer an agreed-upon value in the cryptocurrency among the customer, the merchant, and one or more third parties according to the terms and conditions associated with the invoice.

In particular embodiments, the payment service system 108 may provide dispute resolution for blockchain transactions. Nested smart contracts that allow recourse for cryptocurrency payments may be introduced into a blockchain-enforced contract. Such a nested smart contract may be triggered upon events such as a return request by a customer or dispute as to quality of goods or services. The nested smart contracts associated with dispute resolution may be created based on the transaction information provided and terms and conditions specified by the merchant. They may also be based on baseline customer protections provided by the payment service system 108. Execution of such nested smart contracts may allow the payment service system 108 or a customer to recapture value transferred in a blockchain transaction.

Figure 3A:
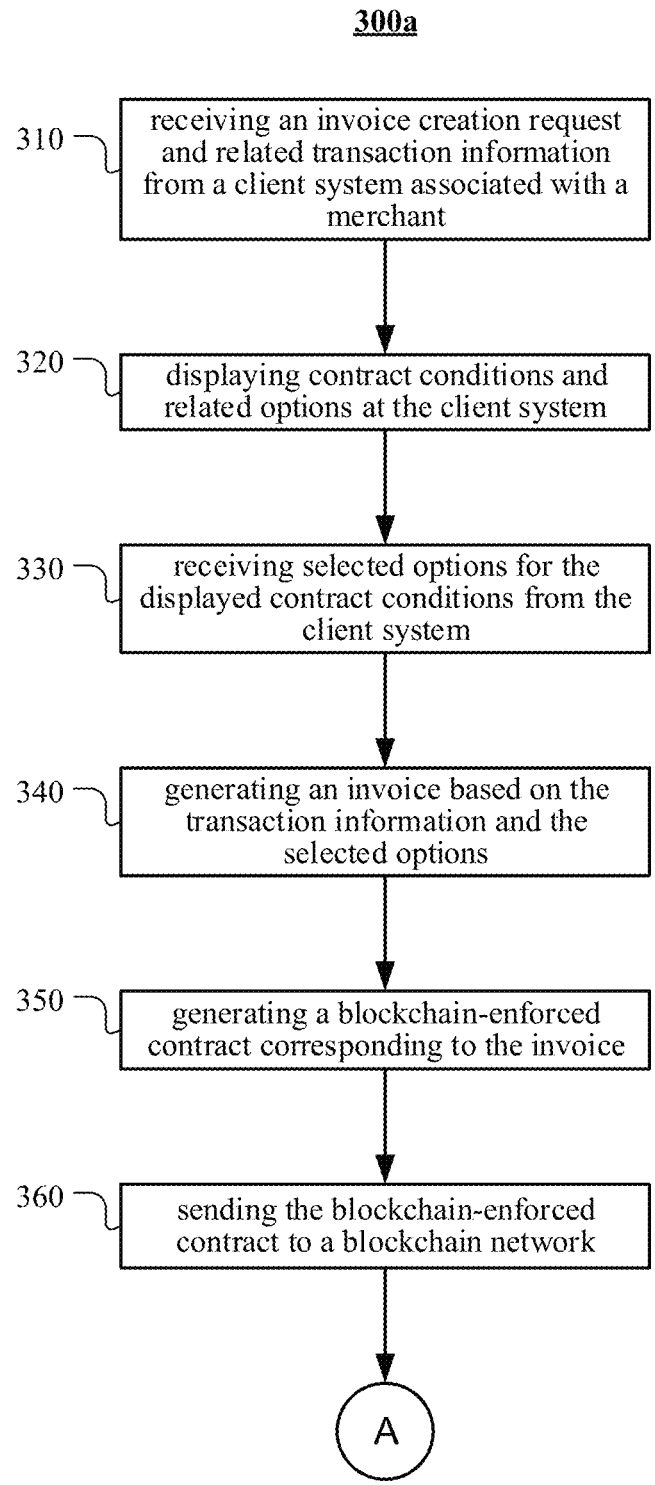
FIG. 3A illustrates an example method 300a for creating a blockchain-enforced contract based on information associated with an invoice.

FIG. 3A illustrates an example method 300a for creating a blockchain-enforced contract based on information associated with an invoice. The method may begin at step 310, where a payment service system 108 may receive an invoice creation request and related transaction information from a client system associated with a merchant (e.g., a merchant client system). The merchant client system may comprise a POS device 105 or another suitable client system associated with the merchant. The merchant may create the invoice creation request by sending an input to the payment service system 108 or interacting with one or more elements in a user interface associated with the payment service system 108. The transaction information may comprise, for example, information about a value to be transferred in association with the invoice, information about goods or services associated with the invoice, information about one or more terms and conditions associated with the invoice, information about a return or dispute resolution policy associated with the invoice, information about a customer account associated with a customer, or information about a merchant account associated with the merchant. Here, the value may be represented in a selected cryptocurrency (e.g., BTC, ETH, LTC) or blockchain-based token (e.g., EOS, TRX, VEN, USDT). Alternatively, the value may be represented in a fiat currency (e.g., USD, EUR). In particular embodiments, the customer account and merchant account may comprise accounts associated with the payment service system 108 or accounts associated with a blockchain network 145. The blockchain network 145 may be associated with a selected cryptocurrency in which the value of the invoice is represented.

Figure 4F:
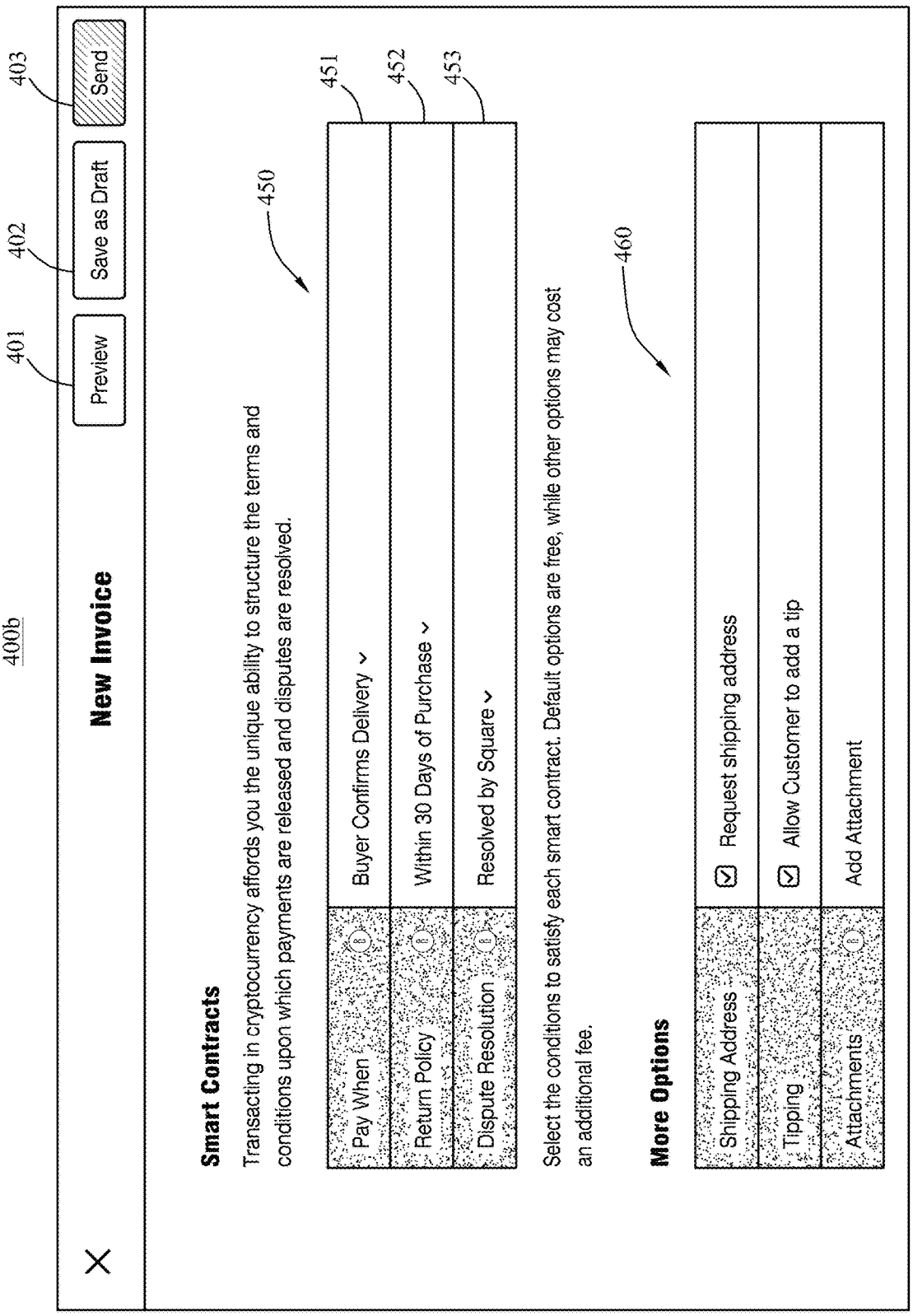

FIGS. 4A-4I illustrate example user interfaces for creating an invoice and collecting information for a blockchain-enforced contract corresponding to the invoice. Upon receiving an invoice creation request from a merchant, the payment service system 108 may send instructions to the merchant client system to display a user interface 400a shown in FIG. 4A. The user interface 400a may comprise a plurality of interactive elements. For example, the user interface 400a may comprise a button 401 for previewing an invoice being generated, a button 402 allowing the merchant to save a draft of the invoice, and a button 403 allowing the merchant to send a generated invoice to one or more customers. The user interface 400a may comprise one or more fields for collecting transaction information associated with an invoice. For example, it may comprise a field 410 for collecting customer information (e.g., name, email address) and a field 420 for collecting details about the invoice (e.g., invoice title, invoice ID, message, invoice method, timing to send the invoice, due date for payments). As shown in FIG. 4B, a merchant may submit transaction information by inputting such information in one or more fields of the user interface 400a.

As shown in FIG. 4C, the payment service system 108 may send for display to the merchant a user interface 400b that comprises a field 430 summarizing the transaction information and a field 440 allowing the merchant to select one or more additional options (e.g., shipping address, tipping, card on file). The field 430 may include a value associated with the invoice in a default currency indicated in a currency field 432. In this example, the default currency may be USD. As shown in FIG. 4D, upon interactions by the merchant, the user interface 400b may display one or more currency options 434. The currency options 434 may additionally comprise one or more cryptocurrencies (e.g., BTC, ETH). As shown in FIG. 4E, upon the merchant's selection of a particular cryptocurrency (e.g., BTC) as indicated by the field 432, the payment service system 108 may convert the value into the selected cryptocurrency in the user interface 400b.

In particular embodiments, the payment service system 108 may analyze elements of the transaction information as well as other information associated with a requested invoice and the parties involved. The payment service system 108 may analyze information associated with the merchant requesting the invoice such as, for example, profile information associated with the merchant, one or more locations associated with the merchant, a sales volume associated with the merchant, one or more satisfaction ratings associated with the merchant, a transaction history associated with the merchant, a return history associated with the merchant, an evaluation associated with the merchant, one or more settings by the merchant, one or more other suitable information items associated with the merchant, or any combination thereof. The payment service system 108 may analyze information associated with the customer such as, for example, profile information associated with the customer, one or more satisfaction ratings associated with the customer, a transaction history associated with the customer, a return history associated with the customer, an evaluation of the customer, one or more settings by the customer, one or more other suitable information items associated with the customer, or any combination thereof. The payment service system 108 may analyze information about a transaction related to the invoice such as, for example, a nature of the transaction, a date and time associated with the transaction, a quantity of goods or services associated with the transaction, regulatory information associated with the goods or services, information related to fraud detection, one or more other suitable information items associated with the transaction, or any combination thereof. The payment service may also analyze information about monetary transaction associated with the invoice such as, for example, the value specified by the merchant, the currency the value is represented in, an evaluation of volatility of the selected currency, one or more other suitable information items associated with the monetary transaction, or another combination thereof.

At step 320, the payment service system 108 may send instructions to the merchant client system to display one or more of the identified contract conditions. The contract conditions may be displayed together with options generated based on the transaction information. In particular embodiments, the payment service system 108 may identify one or more of a plurality of contract conditions and options related to each contract condition based on the analysis of information related to the invoice. One or more contract conditions may be related to a payment from the customer to the merchant. For example, the contract conditions may comprise providing payment upon receiving confirmation from the customer regarding delivery, providing payment upon receiving confirmation from a shipping agent regarding delivery, providing payment upon receiving confirmation from the merchant regarding shipping, providing payment upon receiving confirmation from the shipping agent regarding shipping, providing payment upon receiving confirmation from the merchant regarding completion of services, providing payment upon receiving confirmation from the customer regarding completion of services, providing payment upon receiving authorization from a third party, another suitable contract condition, or any combination thereof. One or more contract conditions may be related to return or cancellation of an order and corresponding refund policies. For example, the contract conditions may comprise providing a refund upon receiving a return request from the customer within a predetermined period, providing a refund upon receiving confirmation from the merchant regarding delivery of returned goods, providing a refund upon receiving confirmation from a shipping agent regarding delivery of returned goods, providing a refund upon receiving confirmation from the customer regarding shipping of returned goods, providing a refund upon receiving confirmation from the shipping agent regarding of shipping of returned goods, another suitable contract condition, or any combination thereof.

The conditions and options may be identified or customized using one or more machine-learning algorithms or models based on the transaction information and information otherwise accessible to the payment service system 108. The machine-learning models may comprise a plurality of features and may be trained based on previous execution of blockchain-enforced contracts created by the payment service system. The information analyzed for identifying and customizing the conditions and options may comprise information associated with goods or services involved in the corresponding transaction. As an example and not by way of limitation, if the transaction involves perishable goods, the payment service system 108 may select one or more conditions related to purchase and quality disputes, but not conditions related to return of the goods. In this case, the payment service system 108 may also select shipping options that would ensure prompt delivery of the goods. The analyzed information may also comprise historical information associated with the customer or merchant of the transaction. As an example and not by way of limitation, the payment service system 108 may determine, based on a merchant's transaction history and satisfaction ratings, that the merchant often failed to meet customer expectations. The payment service system 108 may select conditions and options corresponding to long return periods (e.g., 30 days rather than 15 days) and low requirements for returns. As another example and not by way of limitation, the payment service system 108 may analyze past invoice behavior of a customer with other merchants and determine that customer occasionally failed to pay invoices on time. The payment service system 108 may select conditions and options corresponding to immediately transferring a required amount of cryptocurrency from an account associated with the customer to the blockchain-enforced contract to be created (rather than when a purchased product is delivered). The analyzed information may further comprise external information about the blockchain network and its corresponding cryptocurrency. As an example and not by way of limitation, the payment service system 108 may determine that a particular cryptocurrency selected by the merchant is associated with high volatility. The payment service system 108 may accordingly select one or more conditions specifying exact points in time when the value associated with the invoice is determined or requiring the value as represented in the cryptocurrency to be determined by reference to a less volatile fiat currency. The payment service system 108 may use the machine-learning algorithms or models to analyze other suitable information and intelligently recommend or suggest conditions or options for selection by merchants or customers.

As shown in FIG. 4F, the payment service system 108 may send instructions to the merchant client system to display one or more of identified contract conditions in the user interface 400b. For example, the user interface 400b may comprise a field 450 for display of the contract conditions, which may comprise a contract condition 451 corresponding to payment for the invoice, a contract condition 452 corresponding to a return policy, and a contract condition 453 corresponding to a dispute resolution policy. The contract conditions may be displayed together with options generated based on the transaction information. As shown in FIG. 4G, the condition 451 corresponding to payment for the invoice may be displayed together with three options 454 corresponding to payment upon buyer confirming delivery, payment upon carrier confirming delivery, or payment upon the payment service confirming delivery. As shown in FIG. 4H, the condition 452 corresponding to a return policy may be displayed together with three options 455 corresponding to return within 30 days of purchase, return upon payment of restocking fee, or return based on reason code for return. In accordance with one example, the contract conditions may be intelligently populated in the user interface 400b based on current transaction information and previous transaction history associated with the merchant and/or customer. As shown in FIG. 4I, the condition 453 corresponding to a dispute resolution policy may be displayed together with three options 456 corresponding to dispute resolution by the community, dispute resolution by the payment service, or dispute resolution by a third-party arbiter. The user interface 400b may further comprise a field 460 comprising one or more additional options. After providing transaction information and selecting required conditions and options, the merchant may click on the button 401 for previewing the invoice being generated, the button 402 to save a draft of the invoice, and the button 403 to send a generated invoice to a customer. If the merchant clicks on the button 403, the payment service system 108 may determine that the merchant consents to a blockchain-enforced contract corresponding to the invoice and automatically signs the contract with a private key associated with the merchant. The customer may receive the invoice as, for example, an email message, a notification displayed on a POS device associated with the merchant, a notification displayed by an application associated with the payment service system 108 installed on a client device of the customer, a notification displayed by an application associated with a cryptocurrency wallet associated with the customer. The invoice received by the customer may comprise a prompt for the customer to sign the blockchain-enforced contract using a private key associated with a cryptocurrency wallet of the customer. The prompt may be in the form of a link, a user-interface element, a barcode, a QR code, any combination thereof, or another suitable form. The customer may provide a digital signature generated based on the private key in response to the prompt. As an example and not by way of limitation, the customer may click on the link and be redirected to a cryptocurrency wallet, in which the customer may initiate a payment transaction to the blockchain-enforced contract. As another example and not by way of limitation, the customer may use an application associated with a cryptocurrency wallet to scan a QR code provided by the POS device to sign the blockchain-enforced contract. As yet another example and not by way of limitation, when the customer has a cryptocurrency wallet controlled by the payment service system 108, the customer may press a "Sign" button in an application associated with the payment service system 108 to sign the blockchain-enforced contract. A digital signature received by a POS device or mobile application associated with the payment service system 108 may be encrypted before transmitted via a network to the blockchain.

At step 330, the payment service system 108 may receive one or more selected options for each of one or more of the identified contract conditions. For a contract condition, one or more of the selected options may correspond to a requirement for determining that the required contract condition is satisfied. A merchant may select one or more options for a particular contract condition by entering an input or interacting with one or more interactive elements in a user interface provided by the payment service system 108.

At step 340, the payment service system 108 may generate an invoice comprising the transaction information and the one or more selected options. The invoice may be sent to the merchant client system to be displayed in a user interface associated with the payment service. The merchant may review the invoice generated by the payment service system 108 and determine whether the information on the invoice is consistent with the merchant intent. If so, the merchant may provide an input indicating that the invoice has been acknowledged. The payment service system 108 may receive the input and proceed to step 350. Otherwise, the merchant may choose to edit or dispose of the invoice.

At step 350, the payment service system 108, upon receiving an input from the merchant affirming the invoice, may generate code associated with a blockchain-enforced contract corresponding to the invoice. The blockchain-enforced contract may comprise a smart contract stored and executable on a blockchain. The blockchain may comprise a public blockchain (e.g., Ethereum), a private blockchain maintained by the payment service system 108, a hard fork of a public blockchain controlled by the payment service system 108, or another suitable record-keeping system. The blockchain-enforced contract may be created to mirror the terms and conditions of the invoice. The blockchain-enforced contract may be configured to automatically transfer a value among the customer account, the merchant account, an account associated with the payment service system 108, or an account associated with a related third party. The blockchain-enforced contract may be configured to repeatedly execute current or future transactions between the merchant and a plurality of customers. Such a transfer of value may be based on a determination that one or more required contract conditions are satisfied. In particular embodiments, the blockchain-enforced contract may comprise one or more identifiers (e.g., public key or address) associated with its parties. In particular embodiments, the blockchain-enforced contract may comprise a digital signature generated based on a private key associated with a blockchain account of a customer or a private key associated with a blockchain account associated with a merchant. Such a digital signature may provide authorization for the blockchain-enforced contract to transfer cryptocurrency out of the corresponding account. The cryptocurrency may be stored at the smart contract. In particular embodiments, the payment service system 108 may control a blockchain account of a merchant or a customer. The payment service system 108 may automatically generate a digital signature when a blockchain-enforced contract is created. The digital signature may be generated in response to one or more inputs by the merchant or customer indicating authorization or agreement. In particular embodiments, the payment service system 108 may not have access to the private key of a blockchain account associated with a merchant or customer. The payment service system 108 may prompt for a message or script to be sent from a client or POS device associated with the merchant or customer containing a digital signature created based on a corresponding private key. The message or script may be sent to the payment service system 108 or directly to the blockchain-enforced contract stored on a public blockchain. The payment service system 108 may confirm that such a message or script has been sent by one party of a transaction and notify the other party accordingly. As an example and not by way of limitation, the payment service system 108 may detect that a customer has send a script to sign a blockchain-enforced contract. It may then notify a merchant to ship a product purchased.

In particular embodiments, the blockchain-enforced contract may comprise one or more nested contracts. Each of the nested contracts may correspond to a particular stage of transaction (e.g., initial purchase, return, dispute resolution). Each nested contract may comprise one or more contract conditions of the identified contract conditions. The nested contract may also specify a value to be transferred as well as the source and destination of the value (e.g., information about the merchant account and the customer account). The one or more contract conditions may be required for executing a transaction or transferring a value corresponding to the nested contract. As an example and not by way of limitation, the blockchain-enforced contract may comprise a first nested contract corresponding to a purchase of goods or services and comprising a first contract condition required for transferring a value from a customer account to a merchant account. The blockchain-enforced contract may comprise a second nested contract corresponding to a return or order cancelation and comprising a second contract condition required for transferring at least a portion of the value from the merchant account back to the customer account. The blockchain-enforced contract may further comprise a third nested contract corresponding to potential dispute resolution and comprising a third contract condition required for initiating a dispute resolution protocol. Each of one or more of the nested contracts may comprise one or more conditions corresponding to a time limit. A nested contract may expire after the time limit and may be inexecutable even if all the other required conditions are satisfied.

At step 360, the payment service system 108 may send the code corresponding to the blockchain-enforced contract to a blockchain network 145. The blockchain network 145 may correspond to a cryptocurrency associated with the invoice. In particular embodiments, the payment service system 108 may broadcast the blockchain-enforced contract to one or more nodes in the blockchain network 145. The nodes may validate the blockchain-enforced contract, save the blockchain-enforced contract on a locally stored copy of the blockchain, and broadcast the blockchain-enforced contract to one or more other nodes within the network. The blockchain network 145 may reach a consensus as to the existence and validity of the blockchain-enforced contract and execute the blockchain-enforced contract upon receipt of required inputs. The blockchain-enforced contract stored on the blockchain may be accessible to the public. Alternatively, the blockchain-enforced contract may be encrypted and only accessible to the parties or the payment service system 108. The code corresponding to the blockchain-enforced contract may be executed by a virtual machine running on nodes associated with the blockchain. The blockchain-enforced contract may be executed to fulfill one or more transactions associated with the invoice. Example steps that may follow the steps in the example method 300a are illustrated a method 300b in FIG. 3B.

Although this disclosure describes and illustrates particular steps of the method of FIG. 3A as occurring in a particular order, this disclosure contemplates any suitable steps of the method of FIG. 3A occurring in any suitable order. Moreover, although this disclosure describes and illustrates an example method for creating a blockchain-enforced contract based on information associated with an invoice including the particular steps of the method of FIG. 3A, this disclosure contemplates any suitable method for creating a blockchain-enforced contract based on information associated with an invoice including any suitable steps, which may include all, some, or none of the steps of the method of FIG. 3A, where appropriate. Furthermore, although this disclosure describes and illustrates particular components, devices, or systems carrying out particular steps of the method of FIG. 3A, this disclosure contemplates any suitable combination of any suitable components, devices, or systems carrying out any suitable steps of the method of FIG. 3A.

Figure 3B:
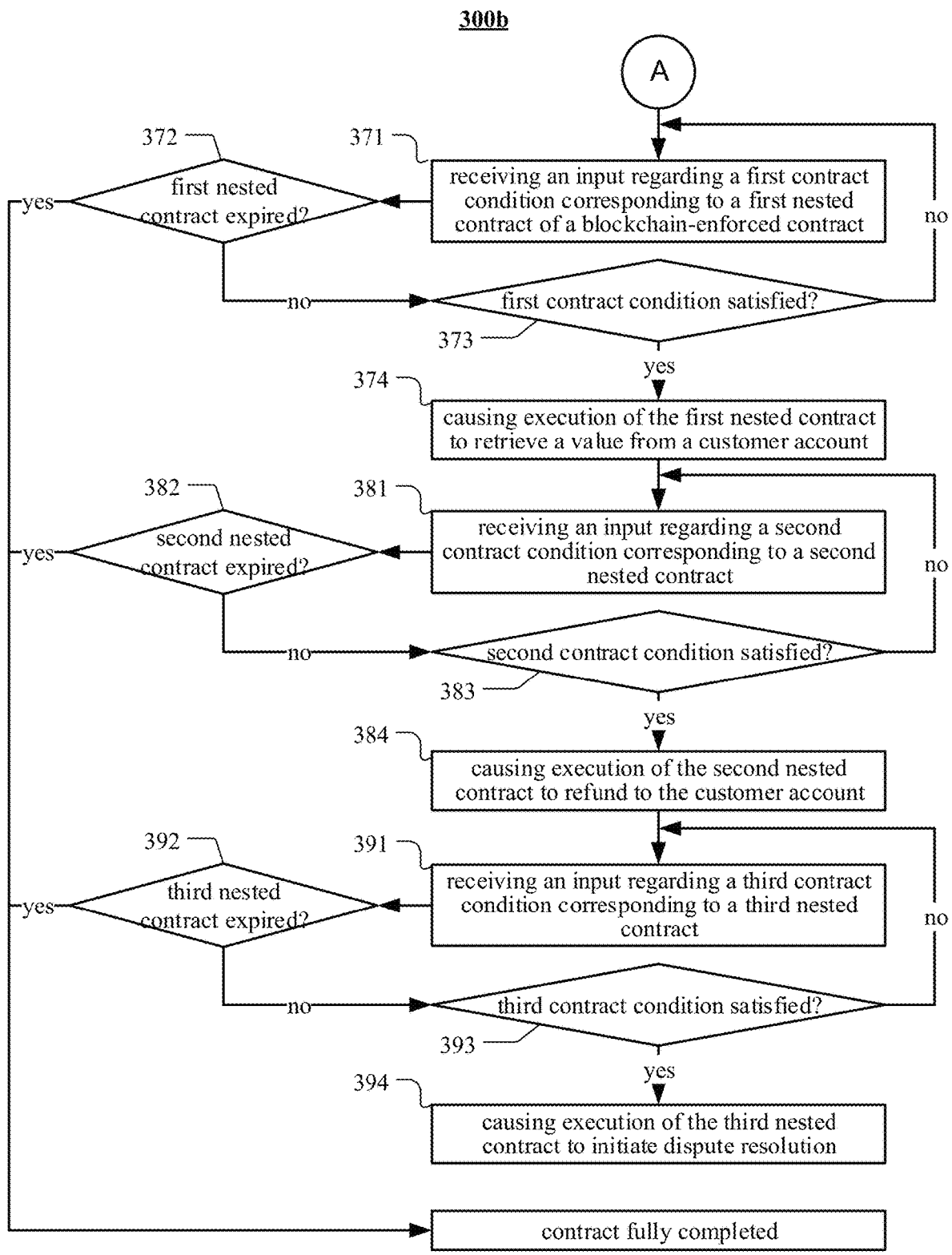
FIG. 3B illustrates an example method 300b for causing execution of a blockchain-enforced contract.

FIG. 3B illustrates an example method 300b for causing execution of a blockchain-enforced contract. The blockchain-enforced contract may have been created based on the method 300a. The steps of the method 300b may therefore follow those of the method 300a. The method may begin at step 371, wherein a payment service system 108 may receive an input regarding a first contract condition corresponding to a first nested contract of a blockchain-enforced contract. The input may be received from the merchant client system, a customer client system, or a system associated with a third party related to the invoice. The customer client system may comprise the merchant device 103 or another suitable client system associated with a customer. As an example and not by way of limitation, the required contract condition may be related to delivery of goods or fulfillment of services associated with the invoice. In this case, the payment service system 108 may receive a confirmation of delivery of the goods or a confirmation of fulfillment of the services from the merchant client system, the customer client system, or a system associated with a shipping agent.

At step 372, the payment service system 108 may determine whether the first nested contract has expired. If the first nested contract is determined to be expired, the method 300b may directly proceed to step 399, where the blockchain-enforced contract is determined to be fully completed. If the first nested contract is determined to not be expired, the method 300b may proceed to step 373. In particular embodiments, a merchant may specify a time limit for a particular invoice, which may correspond to a time window for a customer to place an order. The payment service system 108 may store such information and include a condition corresponding to the time limit in the blockchain-enforced contract. The payment service system 108 may determine whether a nested contract is expired based on the time limit provided by the merchant.

At step 373, the payment service system 108 may generate an assessment regarding whether the first contract condition has been satisfied based on the input regarding the required contract condition. The assessment may comprise a determination that the first contract condition has been satisfied, a determination that the first contract condition has not been satisfied, or a determination that the assessment cannot be finalized. If the first contract condition is determined to have been satisfied, the method 300b may proceed to step 374. Otherwise, the payment service system 108 may wait for further input. As an example and not by way of limitation, the first contract condition may require delivery of particular goods. The payment service system 108 may receive a confirmation of delivery from the merchant client system and may analyze and verify the confirmation of delivery to determine whether the first contract condition has been satisfied. In particular embodiments, the first nested contract may comprise one or more contract conditions other than the first contract condition. The payment service system 108 may generate one or more assessments regarding whether one or more of the other contract conditions have been satisfied.

In particular embodiments, the payment service system 108 may take an action based on the assessment regarding the first contract condition. The action may further be based on one or more assessments associated with one or more other contract conditions. The action may be associated with the invoice or the blockchain-enforced contract. The action may comprise initiating a blockchain transaction on a blockchain associated with the selected cryptocurrency, updating a ledger to deduct the value from the customer account and add the value to the merchant account, generating an amendment to the blockchain-enforced contract, rescinding the invoice, sending a message to the merchant client system, sending a message to the customer client system, another suitable action, or any combination thereof. Based on the assessment, the payment service system 108 may determine whether to engage the blockchain-enforced contract.

As an example and not by way of limitation, based on input received from a merchant client system, the payment service system 108 may determine that one or more contract conditions associated with the first nested contract have not been satisfied. The payment service system 108 may send a message to the merchant client system confirming receipt of the input and soliciting further input. As another example and not by way of limitation, the payment service system 108 may generate an assessment that determines all contract conditions for the first nested contract have been satisfied. Based on this assessment, the payment service system 108 may determine that a value specified in the invoice shall be transferred from a customer account to a merchant account. The payment service system 108 may determine that the customer has an account associated with the payment service system 108 having sufficient funds to cover the value. It may bypass the blockchain-enforced contract and directly transfer the value from the customer account to the merchant account by updating a ledger to deduct the value from the customer account and add the value to the merchant account. As yet another example and not by way of limitation, the input received by the payment service system 108 may comprise a proposal to amend the invoice. Based on the proposal, the payment service system 108 may modify the invoice and generate an amendment to the blockchain-enforced contract.

In particular embodiments, if the payment service system 108 determines that the first contract condition has been satisfied at step 373, it may proceed to step 374, where the payment service system 108 may cause execution of the first nested contract to retrieve a value from the customer account. In particular embodiments, the payment service system 108 may generate a blockchain transaction based on the first input. The blockchain transaction may comprise proof that the first contract condition or one or more other contract conditions have been satisfied. The payment service system 108 may address the blockchain transaction to the blockchain-enforced contract and send it to the blockchain network 145 storing the blockchain-enforced contract. As conditions are satisfied, the blockchain network 145 may cause execution of the generated code associated with the blockchain-enforced contract to retrieve the value from an account of the customer associated with the blockchain. The retrieved value may be represented in a cryptocurrency associated with the blockchain. In particular embodiments, the retrieving the value from the customer account comprises transferring the value from the customer account to an escrow account. The escrow account may be associated with the payment service system 108. Alternatively, the retrieving the value from the customer account comprises transferring the value from the customer account to the merchant account.

In particular embodiments, the blockchain-enforced contract may comprise a second nested contract comprising a contract condition corresponding to, for example, a return or cancellation of an order. At step 381, the payment service system 108 may receive a second input related to the second contract condition. The second input may be received from the merchant client system, the customer client system, or a system associated with a third party related to the invoice. As an example and not by way of limitation, the input may comprise a request for return of goods received from the customer client system.

At step 382, the payment service system 108 may determine whether the second nested contract has expired. If the second nested contract is determined to be expired, the method 300b may directly proceed to step 399, where the blockchain-enforced contract is determined to be fully completed. If the second nested contract is determined to not be expired, the method 300b may proceed to step 383. As an example and not by way of limitation, the invoice may be associated with a sale of good and may comprise a return period. The payment service system 108 may store such information and include a condition corresponding to the return period in the blockchain-enforced contract. The payment service system 108 may determine whether the second nested contract is expired based on whether a request for return of goods is received from the customer client system within the return period.

At step 383, the payment service system 108 may generate an assessment regarding whether the second contract condition has been satisfied based on the second input. The assessment may comprise a determination that the second contract condition has been satisfied, a determination that the second contract condition has not been satisfied, or a determination that the assessment cannot be finalized. As an example and not by way of limitation, the second contract condition may require a customer shipping particular goods for return. The payment service system 108 may receive a shipping notification from a third-party shipping agent and may analyze and verify the shipping notification to determine whether the second contract condition has been satisfied. In particular embodiments, the second nested contract may comprise one or more contract conditions other than the second contract condition. The payment service system 108 may generate one or more assessments regarding whether one or more of the other contract conditions have been satisfied.

In particular embodiments, the payment service system 108 may take an action based on the assessment regarding the second contract condition. The action may further be based on one or more assessments associated with one or more other contract conditions. The action may be associated with the invoice or the blockchain-enforced contract. The action may comprise determining one or more characteristics of a refund, initiating a blockchain transaction on a blockchain associated with a selected cryptocurrency, updating a ledger to deduct at least part of the value from the merchant account and add the at least part of the value to the customer account, generating an amendment to the blockchain-enforced contract, rescinding the invoice, sending a message to the merchant client system, sending a message to the customer client system, another suitable action, or any combination thereof. The one or more characteristics of the refund may comprise a value of the refund, an adjustment to the value of the refund, a currency associated with the refund, a time delay associated with the refund, other suitable characteristics, or any combination thereof. Based on the assessment, the payment service system 108 may determine whether to engage the blockchain-enforced contract.

In particular embodiments, if the payment service system 108 determines that the second contract condition has been satisfied at step 383, it may proceed to step 384, where the payment service system 108 may cause execution of the second nested contract to issue a refund to the customer account. In particular embodiments, the payment service system 108 may generate a blockchain transaction based on the second input. The blockchain transaction may comprise proof that the second contract condition or one or more other contract conditions have been satisfied. The payment service system 108 may address the blockchain transaction to the blockchain-enforced contract and send it to the blockchain network 145 storing the blockchain-enforced contract. The blockchain network 145 may execute the blockchain-enforced contract to refund at least part of the retrieved value to the customer account. The refunded value may be represented in a cryptocurrency associated with the blockchain. In particular embodiments, the refunding the value to the customer account comprises transferring the value from an escrow account associated with the payment service system 108 to the customer account. The value in the escrow account may have been recaptured from the merchant account upon receiving the customer's request for return. Alternatively, the refunding the value to the customer account may comprise transferring the value from the merchant account to the customer account.

In particular embodiments, the blockchain-enforced contract may comprise a third nested contract comprising a contract condition corresponding to, for example, dispute resolution regarding an order or a return or cancellation. At step 391, the payment service system 108 may receive a third input regarding the third contract condition. The third input may be received from the merchant client system, the customer client system, or a system associated with a third party related to the invoice. As an example and not by way of limitation, the input may comprise a complaint associated with quality of goods or services associated with the invoice.

At step 392, the payment service system 108 may determine whether the third nested contract has expired. If the third nested contract is determined to be expired, the method 300b may directly proceed to step 399, wherein the blockchain-enforced contract is determined to be fully completed. If the third nested contract is determined to not be expired, the method 300b may proceed to step 393. As an example and not by way of limitation, the invoice may allow for a first period for return of goods and a second period for dispute over the order. The first period and the second period may or may not be the same. The third nested contract may expire after the second period.

At step 393, the payment service system 108 may generate an assessment regarding the third contract condition has been satisfied based on the third input. The assessment may comprise a determination that the third contract condition has been satisfied, a determination that the third contract condition has not been satisfied, or a determination that the assessment cannot be finalized. As an example and not by way of limitation, the third contract condition may require that the second nested contract has expired and a complaint submitted by the customer. The payment service system 108 may receive such a complaint from the customer client system. The payment service system 108 may check the complaint to determine if it meets particular formal requirements. The payment service system 108 may also check the invoice or the blockchain-enforced contract to determine whether the second nested contract has expired. In particular embodiments, the third nested contract may comprise one or more contract conditions other than the third contract condition. The payment service system 108 may generate one or more assessments regarding whether one or more of the other contract conditions have been satisfied.

In particular embodiments, the payment service may take an action based on the assessment regarding the third contract condition. The action may further be based on one or more assessments associated with one or more other contract conditions. The action may be associated with the invoice or the blockchain-enforced contract.

In particular embodiments, if the payment service system 108 determines that the third contract condition has been satisfied at step 393, it may proceed to step 394, where the payment service system 108 may cause execution of the third nested contract to initiate a dispute resolution protocol. As an example and not by way of limitation, upon determining that the third contract condition has been satisfied, the payment service may trigger a transaction associated with the blockchain-enforced contract to recapture the value associated with the invoice. The value may be transferred to an escrow account associated with the payment service system 108. The payment service may then act an arbiter and transfer the value to one or more of the parties when a resolution is reached. As another example and not by way of limitation, execution of code associated with the third nested contract may trigger a dispute resolution protocol involving participation of one or more third-party users of the blockchain network 145 to collectively reach a decision regarding the dispute.

Although this disclosure describes and illustrates particular steps of the method of FIG. 3B as occurring in a particular order, this disclosure contemplates any suitable steps of the method of FIG. 3B occurring in any suitable order. Moreover, although this disclosure describes and illustrates an example method for causing execution of a blockchain-enforced contract including the particular steps of the method of FIG. 3B, this disclosure contemplates any suitable method for causing execution of code associated with a blockchain-enforced contract including any suitable steps, which may include all, some, or none of the steps of the method of FIG. 3B, where appropriate. Furthermore, although this disclosure describes and illustrates particular components, devices, or systems carrying out particular steps of the method of FIG. 3B, this disclosure contemplates any suitable combination of any suitable components, devices, or systems carrying out any suitable steps of the method of FIG. 3B.

Figure 4J:
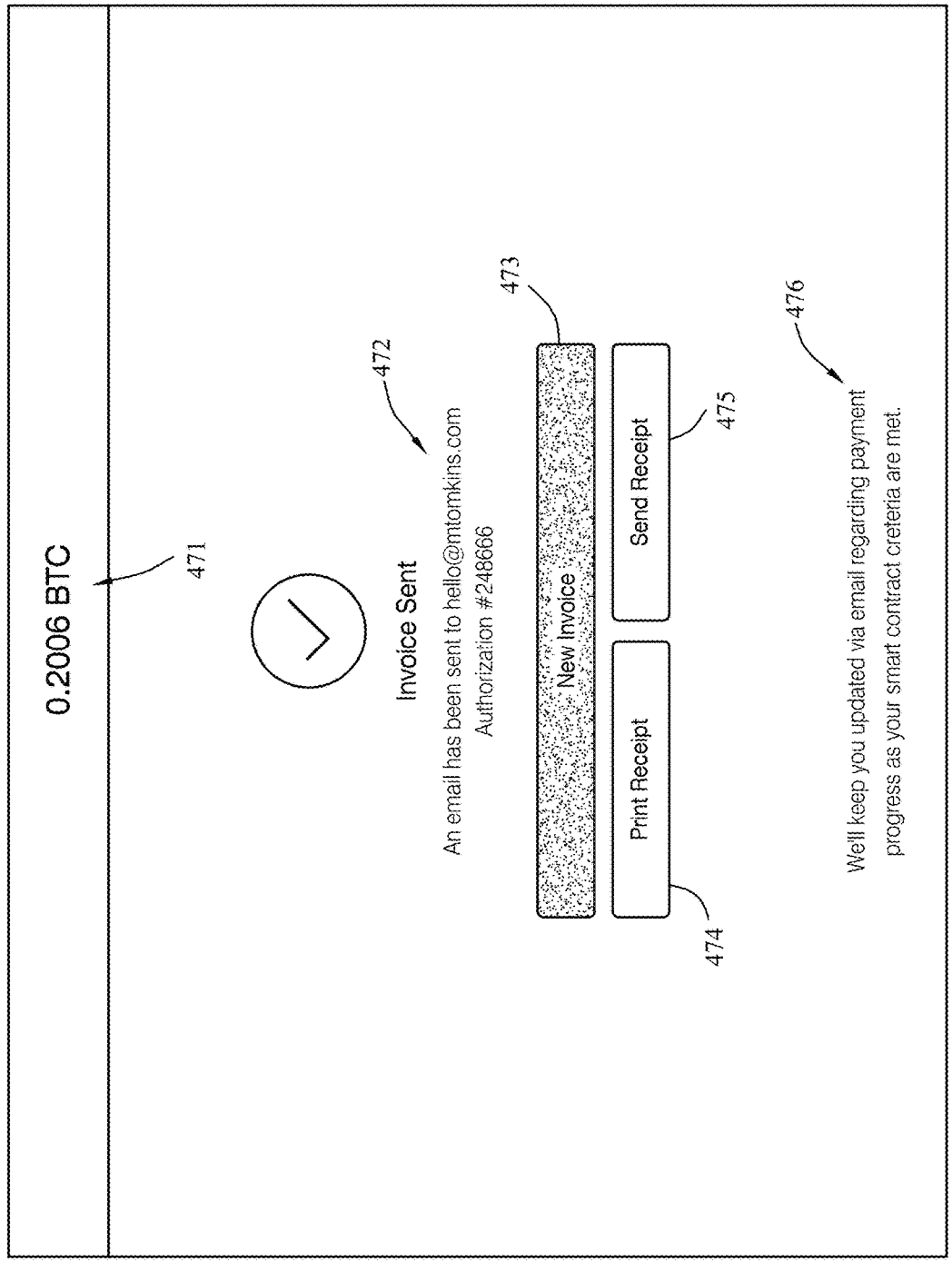

FIGS. 4J-4L illustrate example user interfaces for tracking the status of an invoice and a corresponding blockchain-enforced contract. After an invoice is sent to a customer, the payment service system 108 may send for display to the merchant a user interface 400c as shown in FIG. 4J. The user interface 400c may display various information about the invoice such as a related value 471 and an authorization number 472. The user interface 400c may also comprise one or more interactive elements such as a button 473 for generating a new invoice, a button 474 for printing a receipt, and a button 475 for sending a receipt. The user interface 400c may also display a notice 476 informing the merchant of the payment service's functionality of tracking the payment progress. The payment service system 108 may also send for display to the merchant a user interface 400d as shown in FIG. 4K. The user interface 400d may comprise a summary 481 of total values for invoices over a particular period, a button 482 for creating a new invoice, a list 483 of previous or pending invoices, one or more filters 484 for the invoice records. As shown in FIG. 4L, the merchant may click on an entry 485 corresponding to a particular invoice to access status information associated with the invoice. The status information may be displayed in a window 490, which may comprise a field 491 to display status updates associated with the invoice and a field 492 to display information associated with the invoice. The status updates displayed in the field 491 may be obtained by the payment service system 108 from information stored in the blockchain that stores the blockchain-enforced contract. Although FIGS. 4A-4L illustrate particular user interfaces associated with particular invoices or blockchain-enforced contracts, this disclosure contemplates any suitable user interfaces associated with any suitable invoices or blockchain-enforced contracts.

In particular embodiments, the blockchain-enforced contract may be executed based on a public blockchain (e.g., Ethereum), a private blockchain maintained by the payment service system 108, a hard fork of a public blockchain controlled by the payment service system 108, or another suitable record-keeping system. The blockchain-enforced contract may be executed by a plurality of nodes to a public blockchain, a plurality of nodes authorized by an authority (e.g., the payment service system 108), a server associated with the payment service system 108, one or more other suitable computing systems, or any combination thereof. Details about a blockchain-enforced contract and the execution of one or more transactions associated with the blockchain-enforced contract may be totally or partially made available to the public, a plurality of users associated with the payment service system 108, or only the parties related to an invoice.

In particular embodiments, the involvement of the payment service system 108 in the execution of the blockchain-enforced contract may vary based on the use case. In particular embodiments, the payment service system 108 may receive an input regarding one or more contract conditions associated with the blockchain-enforced contract, create a blockchain transaction comprising the information contained in the input that is addressed to the blockchain-enforced contract, and send the blockchain transaction to the blockchain network 145. By directly relaying inputs from customer client systems, merchant client systems, or third-party systems directly to the blockchain network 145, the payment service system 108 may avoid performing the steps of assessing whether particular conditions of the blockchain-enforced contract are satisfied. This approach may make the execution of the transactions associated with the invoice more public and auditable. On the other hand, if the payment service system 108 performs steps related to determining the expiration or satisfaction of particular contract conditions, the transaction cost may be reduced by reducing the complexity of the blockchain-enforced contract or reducing the number transactions run by the blockchain network 145.

In particular embodiments, the blockchain-enforced contract may be configured to directly receive an input from a customer client system, a merchant client system, or a third-party system. As an example and not by way of limitation, the payment service system 108 may provide an application for installation on the customer client system, the merchant client system, or a third-party system. The application may receive an input from one or more of the parties (e.g., interaction with a button confirming product delivery, input in a field for filing a dispute). The application may formulate information associated with the input into a blockchain transaction associated with the blockchain-enforced contract and send the blockchain transaction to the blockchain network 145. As another example and not by way of limitation, the blockchain-enforced contract may be configured to receive an input by placing an application programming interface (API) call to a third-party service provider (e.g., a shipping agent). As yet another example and not by way of limitation, the blockchain-enforced contract may be configured to call an oracle service to obtain information regarding one or more contract conditions. The oracle may find and verify occurrence of events in the real world based on, for example, information available on the internet. It may interface with the blockchain network 145 and provided the information to the blockchain for use by smart contracts. In particular embodiments, the blockchain-enforced contract may be executed based on the input it directly receives without the involvement of the payment service system 108.

In particular embodiments, a blockchain is a data structure that may comprise an ordered, back-linked list of data records. The data records in a blockchain may be included in a plurality of blocks, each of which (except a genesis block) may comprise a reference to a preceding block. A blockchain may be used to enable various applications. For example, it may be used as a shared ledger of time-stamped transactions, which may facilitate efficient and secure recording of transactions among a plurality of parties.

Figure 5A:
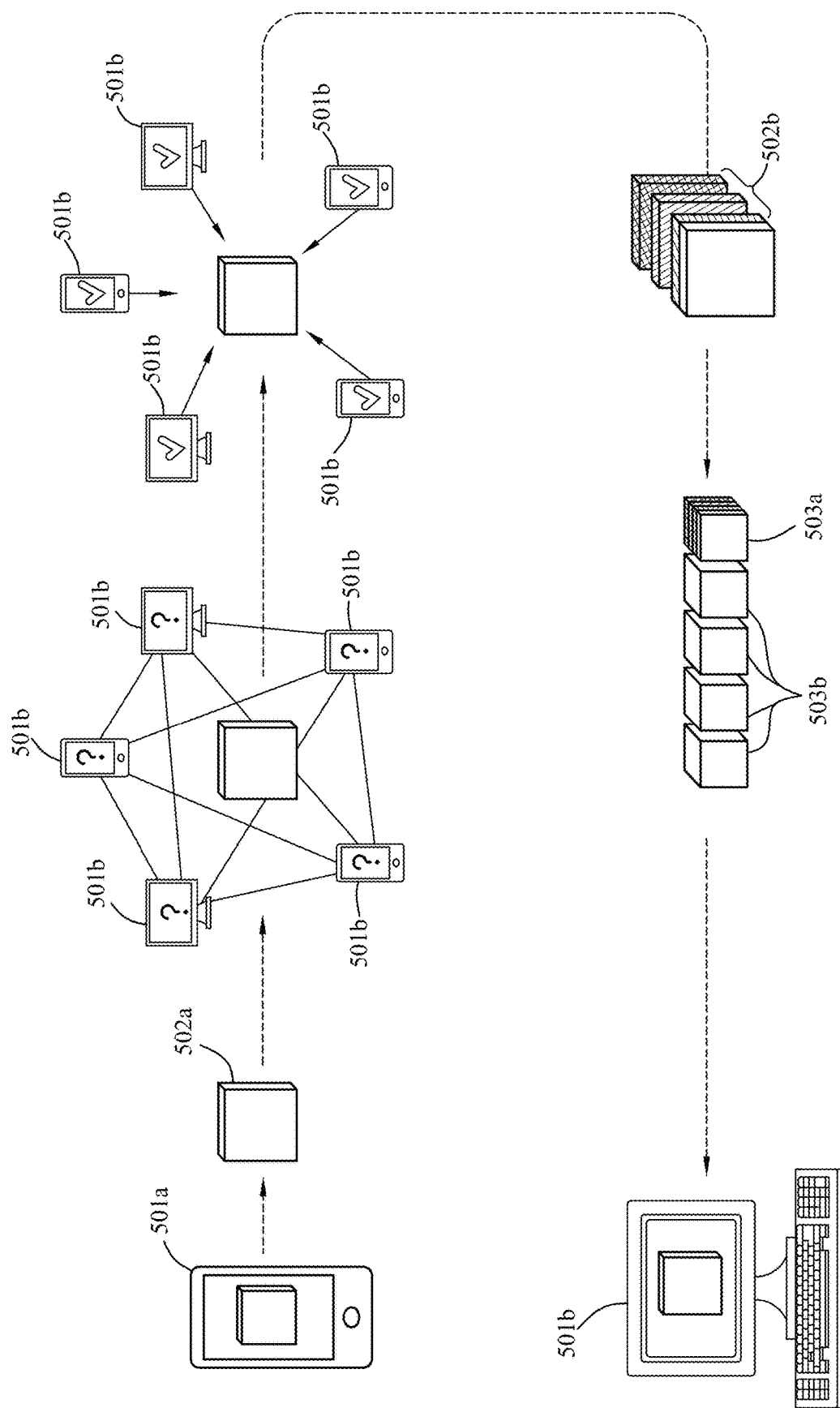
FIGS. 5A and 5B illustrate an example method for recording a transaction in a blockchain.
Figure 5B:
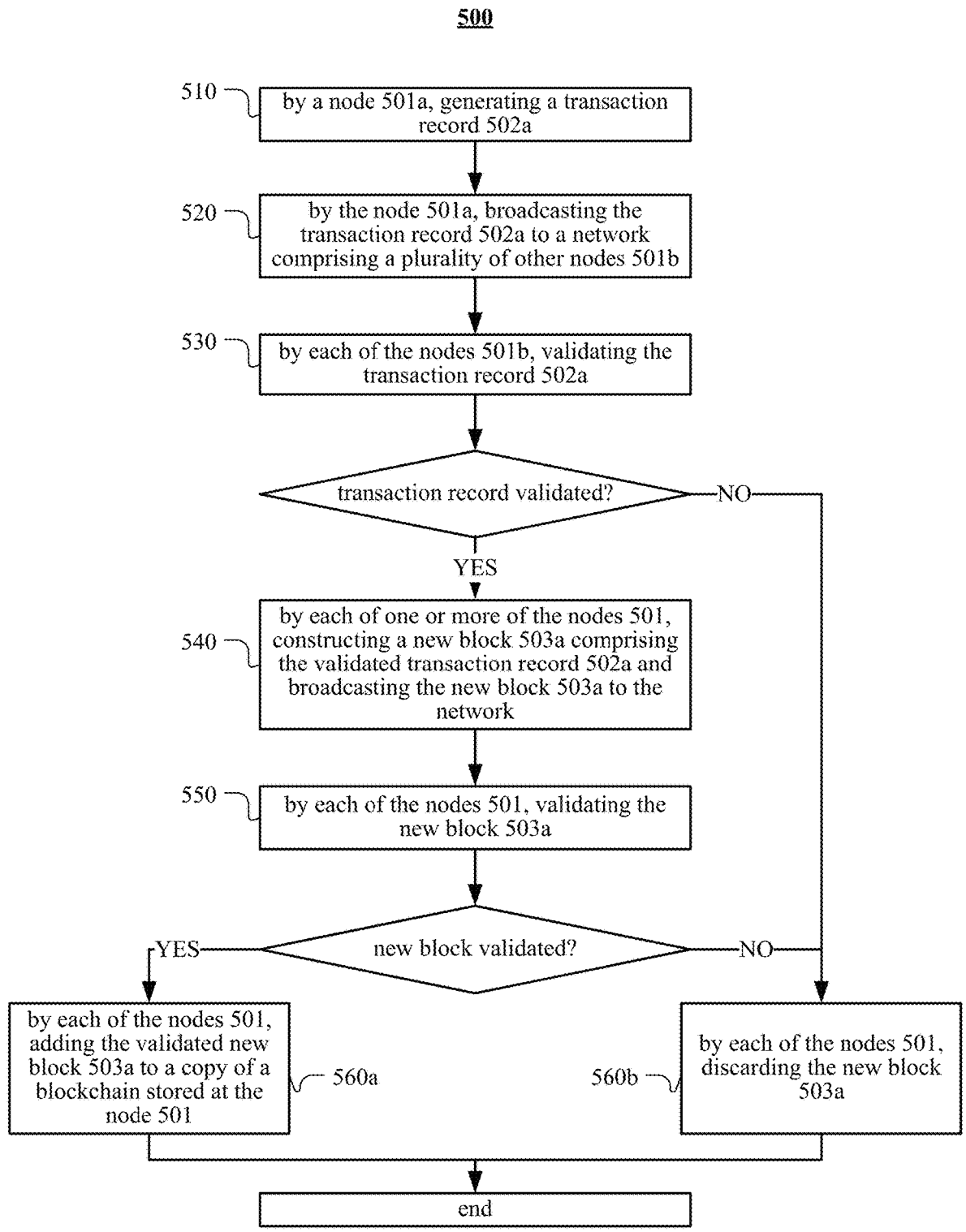

FIGS. 5A and 5B illustrate an example method 500 for recording a transaction in a blockchain. In particular embodiments, at step 510, a node 501a may generate a transaction record 502a. The node 501a may comprise a computing system (e.g., a data center, a computer server, a personal computer, a mobile device, a special-purpose circuit, a GPU) associated with a user. In particular embodiments, the node 501a may comprise one or more client applications configured to execute protocols for blockchain management. The functionalities of the one or more client applications may comprise storing one or more identifiers of an account associated with the user created using, for example, public-key cryptography, storing and updating a copy of a distributed blockchain, creating transactions, validating transactions, aggregating transactions to create blocks, validating blocks, discovering and maintaining connections to peer nodes, or performing one or more other suitable actions. The client applications may also support more than one accounts associated with the first user. In particular embodiments, each account may be associated with one or more private-public key pairs generated randomly or derived from a common seed. The private keys may be protected by one or more data-security methods. In particular embodiments, the transaction record 502a generated by the node 501a may comprise information about an input and an output associated with a corresponding transaction. The input may comprise one or more identifiers referencing one or more outputs of one or more previous transactions, information to establish control or ownership over the referenced output of the previous transaction, a digital signature created based on a private key associated with the account, a public key associated with the account and the private key, or other suitable information. The output may comprise a description of the subject of the transaction (e.g., an amount of assets, information, contract rights), a cryptographic puzzle that determines conditions required to take control or ownership of the output, information about or derived from a public key or address of an intended recipient account (the address may comprise a hash of the public key), or other suitable information.

At step 520, the node 501a may broadcast the transaction record 502a to a network comprising a plurality of other nodes 501b running client applications for executing the protocol for blockchain management. The network may further comprise one or more nodes 501 running one or more protocols incompatible with that run by the client applications associated with the node 501a, but connected to the network by one or more gateway routing servers. In particular embodiments, the network may be a non-hierarchical peer-to-peer (P2P) network. Alternatively, it may be a hierarchical network comprising one or more nodes having authority or administrative functionalities over other nodes. The architecture of the network may be structured on top of and based on the internet. Data transmitted within the network may be accessible to the public. Alternatively, one or more network connections associated with the network may be protected by encryption or authentication. In particular embodiments, when the network is a P2P network, a new node 501 may be added to the network by first establishing a network connection to at least one existing node 501. Once the new node 501 is connected to the network, it may then perform a "handshake" with the existing node 501 by exchanging information such as version information of the client applications or the protocol for blockchain management run by each node 501, a list of local services supported by each node 501, an IP address of each node 501, information about a copy of the blockchain stored at each node 501, or other suitable information. The existing node 501 may forward information about the new node 501 to one or more other existing nodes 501 and provide address information about one or more other existing nodes 501 to the new node 501, which would allow the new node 501 to discover and connect to additional nodes 501. Each node 501 may compare information about its own copy of the blockchain with such information received from a connected node 501. If a node 501 determines that a connected node 501 stores a fuller or newer copy of the blockchain (e.g., a blockchain with a greater height or number of blocks), it may request blockchain data from the connected node 501 and synchronize its copy of the blockchain to the fuller or newer copy.

At step 530, when a node 501b receives the transaction record 502a from the node 501a, it may independently validate the transaction record 502a. The node 501b may forward the transaction record 502a to one or more other nodes 501b if the transaction record 502a is validated. Otherwise, the node 501b may delete the transaction record 502a. This may ensure that only valid transaction records propagate across the network. The validation may comprise validating that the node 501a has satisfied the conditions for control or ownership over the output of a previous transaction that is referenced by the transaction record 502a. In other words, this may verify that the node 501a possesses the subject of the transaction 502a. In particular embodiments, the validation may be based on public-key cryptography. As an example and not by way of limitation, the validation may be based on a locking script and an unlocking script. The locking script may be included in the previous transaction referenced by the transaction record 502a and may specify one or more conditions that must be met for establishing control or ownership over the output of the referenced previous transaction. The unlocking script may be constructed by the node 501a based at least in part on the locking script, a public key associated with the node 501a, and a digital signature created based on a private key associated with the node 501a. Each node 501b may validate the transaction record 502a by executing the unlocking script and the locking script in sequence, which may return a Boolean value. The Boolean value True may correspond to successful validation. In particular alternative embodiments, the validation may be based on authentication of the transaction 502a and its corresponding account by a trusted authority. In particular embodiments, each node 501b receiving the transaction record 502a may further validate various other aspects of the transaction record 502a including, for example, the syntax and data structure of the transaction record 502a being correct, the size of the transaction record 502a being within a predetermined range, the value of the output of the transaction record 502a being within a predetermined range, the existence of a previous transaction referenced by the transaction record 502a in the blockchain or a pool of recently received transactions, current availability of an output of a previous transaction referenced by the transaction record 502a, the input of the transaction record 502a being sufficient to provide for the output of the transaction record 502a, the inclusion of any required transaction fees, or other suitable aspects of the transaction record 502a. The validation may require searching transactions in the blockchain for one or more previous transactions referenced by the transaction record 502a. If a node 501 stores a copy of the entire blockchain, it may perform the search locally. If a node 501 does not store a copy of the entire blockchain, it may request particular blocks of the blockchain or headers of particular blocks from one or more of its network connections. If a node 501b successfully validates the transaction record 502a, it may forward the transaction record 502a to one or more other nodes 501b in the network. In particular embodiments, validation of the transaction record by a subset of the nodes 501b may be sufficient to move on to step 540 and add a new block to the blockchain.

In addition to validating and forwarding a transaction record 502a, client applications associated with one or more of the nodes 501 may aggregate the transaction record 502a with a plurality of other transaction records 502b into a new block 503a for the blockchain. At step 540, a node 501 may construct a new block 503a by aggregating a plurality of received and validated transactions 502 that have not been included in a copy of the blockchain that the node 501 stores and broadcast the new block 503a to the network. An existing cycle of block construction may be terminated, and a new cycle started either when the node 501 successfully constructs a new block or when the node 501 receives a valid new block from another node 501. The node 501 may construct the new block 503a such that it can be linked to the newest block in the copy of the blockchain stored by the node 501. In particular embodiments, the newly-created block 503a, like each of the other blocks 503b, may comprise a header and a plurality of transaction records 502. Each block 503 may further comprise one or more additional fields, such as a block-size field specifying the size of the block 503 and a transaction-counter field specifying the number of transactions included in the block 503.

In particular embodiments, the header of each block may comprise metadata including, for example, a reference to a block hash of a parent block, a summary of the transaction records included in the block, or other suitable data. The block hash of a particular block 503 may comprise a cryptographic hash of the header of the block 503 and may identify the block 503 uniquely and unambiguously. In particular embodiments, a parent block's block hash may be included in a header of its child block. The header of the child block may then be used to compute the child block's block hash, which may be included in a grandchild block's header. This way, the header of every block 503 may be dependent on the headers of all previous blocks 503 in the blockchain up to a genesis block (e.g., the very first block of a blockchain). It may thus be impossible to change the header of one block 503 in the blockchain without having to change the header of each of its descendants. In particular embodiments, the summary of the transaction records in the block 503a may comprise the root of a binary hash tree (or Merkle tree), which may be obtained by recursively hashing pairs of nodes in the binary hash tree. The leaf nodes of the binary hash tree may each comprise a cryptographic hash of one of the transaction records 502 included in the block 503a. A node 501 may efficiently prove the existence of a particular transaction record 502 in a block 503 by traversing the binary hash tree.

In particular embodiments, the protocol for blockchain management may structure a computationally resource-consuming challenge in the creation process for each new block 503. As an example and not by way of limitation, each node 501 may be required to include a solution satisfying a particular challenge (or a "proof-of-work") in the header of a newly-created block 503 before any other node 501 would accept the block as valid. The protocol may also provide a reward to any node 501 that creates a new block 503 that is eventually included in the blockchain. One or more different nodes 501 may compete to solve the challenge quickly in order to reap the reward. The inclusion of such resource-consuming challenges may make it difficult for any node 501 or group of nodes 501 to attack the security of the blockchain, which may require fast creation of a number of compromised but formally valid blocks. In particular alternative embodiments, the protocol may allow one or more verified and trusted entities to aggregate transactions and construct blocks 503. The trusted entities may be related to a trusted authority associated with the network of nodes. A new block 503 created by a trusted entity may be automatically validated without proof of satisfaction of a particular challenge. After creating a valid new block 503, the node 501 may broadcast it to one or more other nodes 501 in the network.

At step 550, each node 501 receiving a new block 503a may validate the new block 503a. If the new block 503a is validated, the node 501 may add the new block 503a to its copy of the blockchain at step 560a. If the new block 503a is not validated, the node 501 may discard the new block 503a at step 560b. The blockchain may comprise one or more existing blocks 503b. A node 501 may validate various aspects of the new block 503a including, for example, the syntax and data structure of the block being correct, the size of the new block 503a being within an acceptable range, a timestamp included in the new block 503a being within an acceptable period, each transaction record 502 in the new block 503a being valid, a proof of satisfaction of any required challenge being present, or other suitable aspects. Once the new block 503a is validated, the receiving node 501 may identify a reference to the intended parent block 503b of the new block 503a. It may search through its copy of the blockchain to identify the referenced parent block 503b and link the new block to the identified parent block 503b. It may further broadcast the new block 503a to one or more connected nodes 501. In particular embodiments, no block 503b matching the reference to the intended parent of new block 503a may have been included in the blockchain stored by a receiving node 501. In this case, the node 501 may temporarily store the new block 503a in a pool of received blocks and add the new block 503a to the blockchain if a block 503b matching the reference is subsequently received. In particular embodiments, the block 503b referenced by the new block 503a as its parent may not be the newest block in the blockchain stored by the node 501. In this case, it may be determined that a "fork" event in the blockchain occurs because at least the referenced parent block 503b has more than one child blocks 503, thus forming at least two "branches." The node 501 may select one of the "branches" as a main branch of the blockchain based on one or more rules specified in the protocol for blockchain management. As an example and not by way of limitation, the rules may require the node 501 to select the branch that represents the most proof-of-work or, often, the longest branch. A potential tie between two existing branches may be broken by one or more newly received blocks 503. Given that all nodes 501 obey the same rules for resolving fork events, the P2P network may eventually form a decentralized consensus treating a particular branch as the "true" copy of the blockchain. All other branches of a fork event may be removed by each of the nodes 501. In particular alternative embodiments, the protocol for blockchain management may allow for different branches to co-exist and propagate independently.

Particular embodiments may repeat one or more steps of the method of FIG. 5B, where appropriate. Although this disclosure describes and illustrates particular steps of the method of FIG. 5B as occurring in a particular order, this disclosure contemplates any suitable steps of the method of FIG. 5B occurring in any suitable order. Moreover, although this disclosure describes and illustrates an example method for recording a transaction in a blockchain including the particular steps of the method of FIG. 5B, this disclosure contemplates any suitable method for recording a transaction in a blockchain including any suitable steps, which may include all, some, or none of the steps of the method of FIG. 5B, where appropriate. Furthermore, although this disclosure describes and illustrates particular components, devices, or systems carrying out particular steps of the method of FIG. 5B, this disclosure contemplates any suitable combination of any suitable components, devices, or systems carrying out any suitable steps of the method of FIG. 5B.

Figure 6:
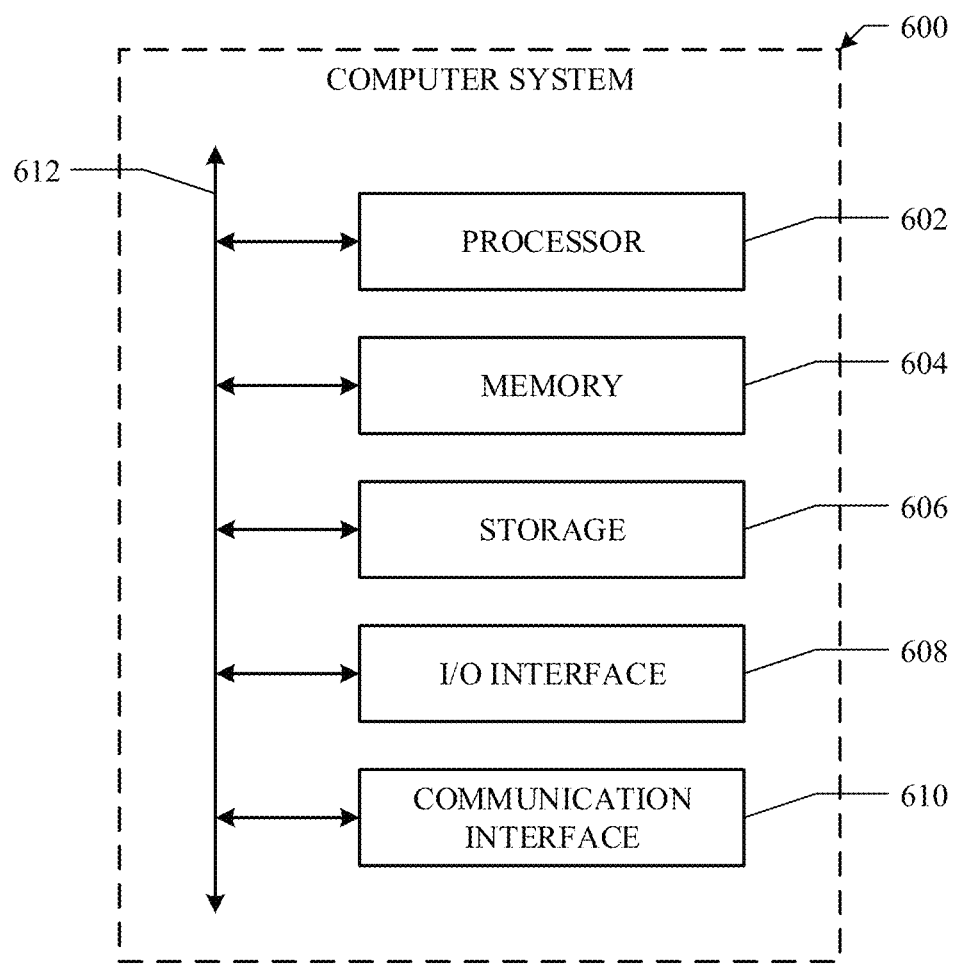
FIG. 6 illustrates an example computer system.

FIG. 6 illustrates an example computer system 600. The computer system 600 may be a computer system associated with the payment service 108, POS device 105, or customer device 103. While these devices may have components in common, such as those illustrated in FIG. 6, it should be appreciated that each of the payment service system 108, POS device 105, or customer device 103 may be specialized devices configured for their specific purposes. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
   one or more processors; and
   one or more computer-readable non-transitory storage media coupled to one or more of the processors and comprising instructions operable when executed by one or more of the processors to cause the system to:
   receive, from a merchant client system associated with a merchant, a request to create a blockchain-enforced contract corresponding to a transaction between the merchant and a customer, the request comprising information about the transaction;
   generate a plurality of contract conditions associated with the transaction to be populated on a user interface associated with the merchant client system, wherein each of the plurality of contract conditions includes one or more selectable options;
   receive, from the merchant client system and via an application executing on the merchant client system, one or more selected options for one or more of the plurality of contract conditions;
   generate instructions for the blockchain-enforced contract corresponding to the transaction between the merchant and the customer wherein the instructions are deployed to a blockchain network, and wherein the instructions for the blockchain-enforced contract comprise a first contract condition required for transferring a value from a customer account associated with the customer to a merchant account associated with the merchant, wherein the first contract condition includes one of the one or more selected options received from the merchant client system;
   contemporaneously with generating the instructions for the blockchain-enforced contract, generate instructions for a nested blockchain-enforced contract corresponding to the transaction between the merchant and the customer, wherein the instructions are deployed to the blockchain network contemporaneously with the instructions for the blockchain-enforced contract, and wherein the instructions for the nested blockchain-enforced contract comprise a plurality of contract conditions required for transferring at least a portion of the value from the merchant account to the customer account, wherein the plurality of contract conditions comprise a second contract condition including one of the one or more selected options received from the merchant client system and a verification of execution of the blockchain-enforced contract;
   subsequent to generating the instructions for the blockchain-enforced contract, provide, to the application executing on the merchant client system or a customer client system associated with the customer in response to a request from the merchant client system or the customer client system, a status of the blockchain-enforced contract or the nested blockchain-enforced contract, wherein the status of the blockchain-enforced contract or the nested blockchain-enforced contract is based on contract conditions comprising the blockchain-enforced contract or the nested blockchain-enforced contract, respectively;
   subsequent to generating the instructions for the blockchain-enforced contract, in response to receiving a first input related to the first contract condition, cause the instructions for the blockchain-enforced contract to be executed on the blockchain network to transfer the value from the customer account to the merchant account;
   subsequent to generating the instructions for the blockchain-enforced contract, receive a second input related to the second contract condition, wherein the second input is received from the merchant client system, the customer client system, or a system associated with a third party related to the transaction;
   verify, in response to receiving the second input, execution of the blockchain-enforced contract;
   generate, based on the second input, an assessment regarding whether the second contract condition has been satisfied; and
   cause, based on the assessment and the verification of execution of the blockchain-enforced contract, the instructions for the nested blockchain-enforced contract to be executed on the blockchain network to transfer at least a portion of the value from the merchant account to the customer account.

2. The system of claim 1, wherein the one or more selectable options are generated based at least in part on a transaction history associated with the merchant or a transaction history associated with the customer.

3. The system of claim 1, wherein the information about the transaction comprises:
   information about the value as represented in a selected cryptocurrency;
   information about goods associated with the transaction;
   information about one or more terms associated with the transaction;
   information about a return policy associated with the transaction;
   information about the customer account; or
   information about the merchant account.

4. The system of claim 1, wherein:
   the first contract condition is related to delivery of goods associated with the transaction; and
   the processors are further operable when executing the instructions to cause the system to receive a confirmation of delivery of the goods from the merchant client system, the customer client system, or a system associated with a shipping agent.

5. The system of claim 1, wherein:
   the second contract condition is related to return of goods associated with the transaction; and
   the processors are further operable when executing the instructions to cause the system to:
      receive a request for return of the goods from the customer client system, and
      determine whether the request for return of the goods is received within a predetermined period.

6. The system of claim 1, wherein the assessment comprises:
   a determination that the second contract condition has been satisfied;
   a determination that the second contract condition has not been satisfied; or
   a determination that the assessment cannot be finalized.

7. The system of claim 1, wherein the execution of the instructions for the blockchain-enforced contract comprises transferring the value from the customer account to an escrow account.

8. The system of claim 1, wherein the execution of the instructions for the blockchain-enforced contract comprises transferring the value from the customer account directly to the merchant account.

9. The system of claim 1, wherein the processors are further operable when executing the instructions to:
   determine one or more characteristics of a refund;
   initiate a blockchain transaction on a blockchain associated with a selected cryptocurrency;
   update a ledger to deduct at least part of the value from the merchant account and add the at least part of the value to the customer account; or
   generate an amendment to the blockchain-enforced contract.

10. The system of claim 1, wherein the instructions for the blockchain-enforced contract are executed based further on one or more other assessments, each regarding whether a third contract condition of the one or more of the plurality of contract conditions has been satisfied.

11. A method comprising:
   by a computing device, receiving, from a merchant client system associated with a merchant, a request to create a blockchain-enforced contract corresponding to a transaction between the merchant and a customer, the request comprising information about the transaction;
   by the computing device, generating a plurality of contract conditions associated with the transaction to be populated on a user interface associated with the merchant client system, wherein each of the plurality of contract conditions includes one or more selectable options;
   by the computing device, receiving, from the merchant client system and via an application executing on the merchant client system, one or more selected options for one or more of the plurality of contract conditions;
   by the computing device, generating instructions for the blockchain-enforced contract corresponding to the transaction between the merchant and the customer wherein the instructions are deployed to a blockchain network, and wherein the instructions for the blockchain-enforced contract comprise a first contract condition required for transferring a value from a customer account associated with the customer to a merchant account associated with the merchant, wherein the first contract condition includes one of the one or more selected options received from the merchant client system;
   contemporaneously with generating the instructions for the blockchain-enforced contract, by the computing device, generating instructions for a nested blockchain-enforced contract corresponding to the transaction between the merchant and the customer, wherein the instructions are deployed to the blockchain network contemporaneously with the instructions for the blockchain-enforced contract, and wherein the instructions for the nested blockchain-enforced contract comprise a plurality of contract conditions required for transferring at least a portion of the value from the merchant account to the customer account, wherein the plurality of contract conditions comprise a second contract condition including one of the one or more selected options received from the merchant client system and a verification of execution of the blockchain-enforced contract;
   subsequent to generating the instructions for the blockchain-enforced contract, by the computing device, providing, to the application executing on the merchant client system or a customer client system associated with the customer in response to a request from the merchant client system or the customer client system, a status of the blockchain-enforced contract or the nested blockchain-enforced contract, wherein the status of the blockchain-enforced contract or the nested blockchain-enforced contract is based on contract conditions comprising the blockchain-enforced contract or the nested blockchain-enforced contract, respectively;
   subsequent to generating the instructions for the blockchain-enforced contract, by the computing device, in response to receiving a first input related to the first contract condition, causing the instructions for the blockchain-enforced contract to be executed on the blockchain network to transfer the value from the customer account to the merchant account;
   subsequent to generating the instructions for the blockchain-enforced contract, by the computing device, receiving a second input related to the second contract condition, wherein the second input is received from the merchant client system, the customer client system, or a system associated with a third party related to the transaction;

verifying, by the computing device and in response to receiving the second input, execution of the blockchain-enforced contract;

generating, by the computing device and based on the second input, an assessment regarding whether the second contract condition has been satisfied; and causing, by the computing device based on the assessment and the verification of execution of the blockchain-enforced contract, the instructions for the nested blockchain-enforced contract to be executed on the blockchain network to transfer at least a portion of the value from the merchant account to the customer account.

12. The method of claim 11, wherein the information about the transaction further comprises:

information about a value represented in a selected cryptocurrency;

information about goods associated with the transaction;

information about one or more terms associated with the transaction;

information about a return policy associated with the transaction;

information about the customer account; or information about the merchant account.

13. The method of claim 11, wherein the first contract condition is related to delivery of goods associated with the transaction, and the method further comprises receiving, by the computing device, a confirmation of delivery of goods from the merchant client system, the customer client system, or a system associated with a shipping agent.

14. The method of claim 11, wherein the second contract condition is related to return of goods associated with the transaction, and the method further comprises:

receiving, by the computing device, a request for return of the goods from the customer client system; and determining, by the computing device, whether the request for return of the goods is received within a predetermined period.

15. The method of claim 11, wherein the execution of the instructions for the blockchain-enforced contract comprises transferring the value from the customer account to an escrow account.

16. The method of claim 11, further comprising:

generating, by the computing device, an invoice for display to the merchant relating to the blockchain-enforced contract comprising the information about the transaction and the one or more selected options; and receiving, by the computing device from the merchant client system, a user input indicating that the invoice has been acknowledged.

17. The method of claim 11, wherein the one or more selectable options are generated based at least in part on a transaction history associated with the merchant or a transaction history associated with the customer.

18. The method of claim 11, wherein the assessment comprises:

a determination that the second contract condition has been satisfied;

a determination that the second contract condition has not been satisfied; or a determination that the assessment cannot be finalized.

19. The method of claim 11, further comprising:

determining one or more characteristics of a refund;

initiating a blockchain transaction on a blockchain associated with a selected cryptocurrency;

updating a ledger to deduct at least part of the value from the merchant account and add the at least part of the value to the customer account;

generating an amendment to the blockchain-enforced contract.

20. One or more computer-readable non-transitory storage media embodying software that is operable when executed to:

receive, from a merchant client system associated with a merchant, a request to create a blockchain-enforced contract corresponding to a transaction between the merchant and a customer, the request comprising information about the transaction;

generate a plurality of contract conditions associated with the transaction to be populated on a user interface associated with the merchant client system, wherein each of the plurality of contract conditions includes one or more selectable options;

receive, from the merchant client system and via an application executing on the merchant client system, one or more selected options for one or more of the plurality of contract conditions;

generate instructions for the blockchain-enforced contract corresponding to the transaction between the merchant and the customer wherein the instructions are deployed to a blockchain network, and wherein the instructions for the blockchain-enforced contract comprise a first contract condition required for transferring a value from a customer account associated with the customer to a merchant account associated with the merchant, wherein the first contract condition includes one of the one or more selected options received from the merchant client system;

contemporaneously with generating the instructions for the blockchain-enforced contract, generate instructions for a nested blockchain-enforced contract corresponding to the transaction between the merchant and the customer, wherein the instructions are deployed to the blockchain network contemporaneously with the instructions for the blockchain-enforced contract, and wherein the instructions for the nested blockchain-enforced contract comprise a plurality of contract conditions required for transferring at least a portion of the value from the merchant account to the customer account, wherein the plurality of contract conditions comprise a second contract condition including one of the one or more selected options received from the merchant client system and a verification of execution of the blockchain-enforced contract; and subsequent to generating the instructions for the blockchain-enforced contract, provide, to the application executing on the merchant client system or a customer client system associated with the customer in response to a request from the merchant client system or the customer client system, a status of the blockchain-enforced contract or the nested blockchain-enforced contract, wherein the status of the blockchain-enforced contract or the nested blockchain-enforced contract is based on contract conditions comprising the blockchain-enforced contract or the nested blockchain-enforced contract, respectively;

subsequent to generating the instructions for the blockchain-enforced contract, in response to receiving a first input related to the first contract condition, cause the instructions for the blockchain-enforced contract to be executed on the blockchain network to transfer the value from the customer account to the merchant account;

subsequent to generating the instructions for the blockchain-enforced contract, receive a second input related to the second contract condition, wherein the second input is received from the merchant client system, the customer client system, or a system associated with a third party related to the transaction;

verify, in response to receiving the second input, execution of the blockchain-enforced contract;

generate, based on the second input, an assessment regarding with the second contract condition has been satisfied; and cause, based on the assessment and the verification of execution of the blockchain-enforced contract, the instructions for the nested blockchain-enforced contract to be executed on the blockchain network to transfer at least a portion of the value from the merchant account to the customer account.

* * * * *